US010668955B2

(12) United States Patent
Siegel et al.

(10) Patent No.: US 10,668,955 B2
(45) Date of Patent: Jun. 2, 2020

(54) FENDER FLARE FOR VEHICLES

(71) Applicant: Trim-Lok, Inc., Buena Park, CA (US)

(72) Inventors: Ken Siegel, Redondo Beach, CA (US); Tien Tran, Stanton, CA (US)

(73) Assignee: TRIM-LOK, INC., Buena Park, CA (US)

( * ) Notice: Subject to any disclaimer, the term of this patent is extended or adjusted under 35 U.S.C. 154(b) by 0 days.

(21) Appl. No.: 16/522,264

(22) Filed: Jul. 25, 2019

(65) Prior Publication Data

US 2020/0031404 A1    Jan. 30, 2020

Related U.S. Application Data

(60) Provisional application No. 62/703,343, filed on Jul. 25, 2018.

(51) Int. Cl.
*B62D 25/18* (2006.01)
(52) U.S. Cl.
CPC ................... *B62D 25/18* (2013.01)
(58) Field of Classification Search
CPC .............................. B62D 25/18; B62D 25/182
USPC .......................................................... 280/848
See application file for complete search history.

(56) References Cited

U.S. PATENT DOCUMENTS

| 4,115,974 A * | 9/1978 | Purcell | ..................... B60C 23/18 |
| | | | 296/1.08 |
| 4,174,850 A | 11/1979 | Hart | |
| 4,695,499 A | 9/1987 | Whitener | |
| 5,340,154 A * | 8/1994 | Scott | ..................... B62D 25/18 |
| | | | 280/154 |
| D382,239 S | 8/1997 | Logan et al. | |
| 5,697,644 A | 12/1997 | Logan et al. | |
| 6,205,642 B1 * | 3/2001 | Czirmer | ................. B62D 25/18 |
| | | | 280/154 |
| D511,727 S | 11/2005 | Shaw et al. | |
| D582,825 S | 12/2008 | Logan | |
| 7,578,526 B2 * | 8/2009 | Jaeger | ..................... B60R 13/04 |
| | | | 280/154 |
| D623,103 S | 9/2010 | Braga | |
| 8,118,329 B2 | 2/2012 | Braga | |
| 2002/0158460 A1 * | 10/2002 | Logan | ..................... B60R 13/04 |
| | | | 280/848 |
| 2005/0275212 A1 | 12/2005 | Angelaitis | |

* cited by examiner

*Primary Examiner* — John D Walters
(74) *Attorney, Agent, or Firm* — Cislo & Thomas, LLP

(57) ABSTRACT

A fender flare for attachment to a fender of a vehicle, the fender flare having a flap and a support system operatively connected to the flap to attach the flap to the fender. The support system has a trim having or being capable of adopting a U-shaped configuration. To improve connection to the fender, the support system can have a carrier embedded within the walls of the trim or protrusions projecting from the walls of the trim to facilitate a gripping action of the walls against the fender. Fasteners can also be used to facilitate securement of the support system to the fender. A thinned segment between the trim and the flap can be used to eliminate certain distortions in the fender flare and for efficient packaging. A seal projecting obliquely from the first wall at a top end of the first wall may be used to keep debris out.

24 Claims, 19 Drawing Sheets

FENDER FLARE FOR VEHICLES

CROSS-REFERENCE TO RELATED APPLICATION

This patent application claims the benefit of U.S. Provisional Patent Application Ser. No. 62/703,343, entitled "Fender Flare with Edge Trim," filed Jul. 25, 2018, which application is incorporated in its entirety here by this reference.

TECHNICAL FIELD

This invention relates to fender flares for vehicles.

BACKGROUND

Fender flares (for wheel wells), in general, are typically used in various industries (Ambulances, Buses, Truck body's, Shuttles, Fire Trucks, RV's, and more) for fender protection and/or cosmetic purposes around a fender of the vehicle. These fender flare parts are typically installed using a separate metal strip and/or bolts/washers/nuts to securely fasten them to the fender.

Such installation process can be very difficult and labor intensive, sometimes utilizing two operators to install per fender. For example, prior art installation processes require the use of steel templates to be clamped (4-5 clamps around the fender) with the rubber flare onto the fender. The templates have holes identifying where to drill holes in the fender. Holes have to be drilled into the fender (minimum 8, and up to 18 per fender). Once the holes are drilled, at least one operator has to hold the 2-foot, heavy extrusion while the other operator drills the rubber fender flare and aligns the part to the first hole, and inserts the metal support strip and/or bolts/washers/nuts for secure attachment. The template is then removed. This tedious and laborious process has to be performed repeatedly for each fender, which can take a minimum of approximately 20 minutes per fender. Furthermore, the drilled holes through the fender for the bolts are a source for rust over time.

In addition, the manufacturing process is tedious. To manufacture fender flares, the raw rubber is extruded in coils (radiused) onto flat plates. For example, there may be approximately 100 feet per plate. Those plates are then placed onto racks, which are then wheeled into an autoclave for curing under high temperature and pressure. As such, the current manufacturing process is a two-step method. Thus, the part is already in "radius" when shipped to customer in 100-foot coils.

For the foregoing reasons there is a need for a fender flare that is easy to manufacture and install without the potential for additional damage to the vehicle.

SUMMARY

The present invention is directed to a multi-extruded rubber flap and support system. The flap may be smaller in size than standard fender flares, thus being lighter in weight. The flap is connected to a support system, such as a rubber edge trim. The trim can have a metal carrier that is responsible for "gripping" the fender. A piece of weather-strip tape can be applied to a back surface of the support system to aid in assembly and provide sealing to the fender. The design is an all in one fender flare thereby having advantages and speed in operator installation, weight reduction, SKU reduction, and overall cost reduction.

For example, in use the operator positions the trim opening over the fender edge and pushes to install the trim around the perimeter of the fender. In some embodiments in which adhesives are used, the operator additionally peels a small amount of the tape liner from one tape edge of the fender flare and applies pressure to the fender for the tape to adhere. Therefore, installation of the present invention only takes about 2 minutes per fender.

In addition, the manufacturing process has been economized. The present method uses a continuous extrusion one-step method from raw rubber, curing media, cooling bath, and taping inline, all in one process. Therefore, it is more efficient than the two-step method of traditional manufacturing processes. In the present invention, the part can be cut in straight lengths or the part can be coiled onto plates. The manufacturing process of the present invention has the flexibility and option of manufacturing to supply customers in cut lengths or bulk coils and still maintain a great look on the vehicle fender.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 3A:
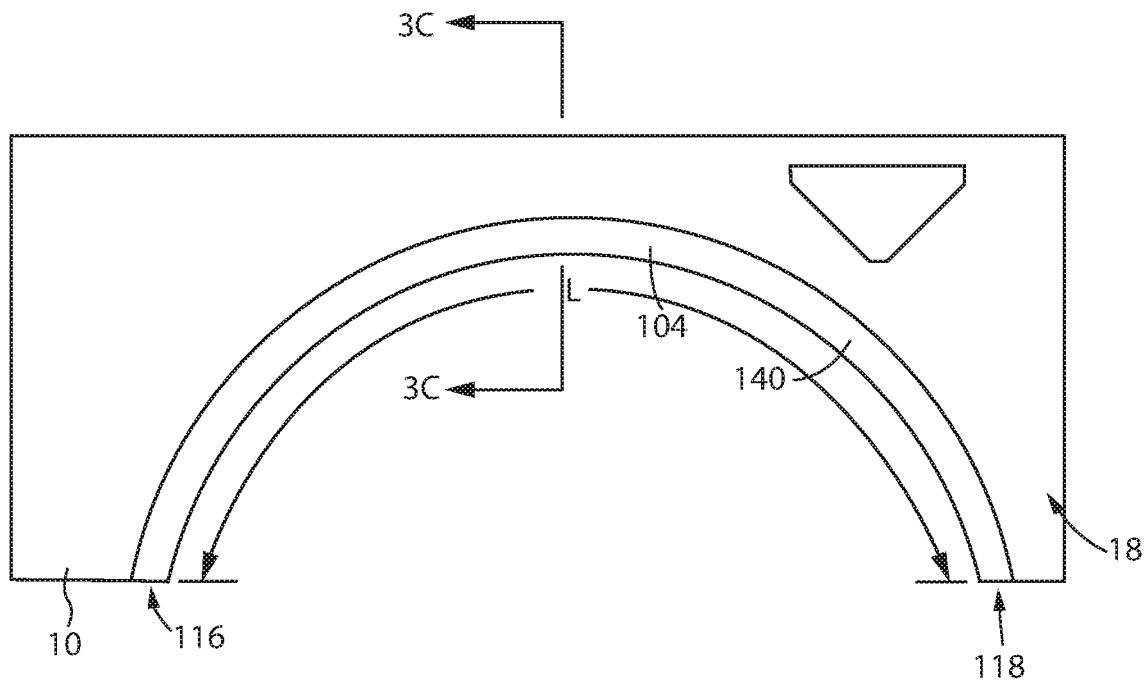
FIG. 3A shows a side elevation view from the inboard side of a fender with an embodiment of the fender flare installed.
Figure 3B:
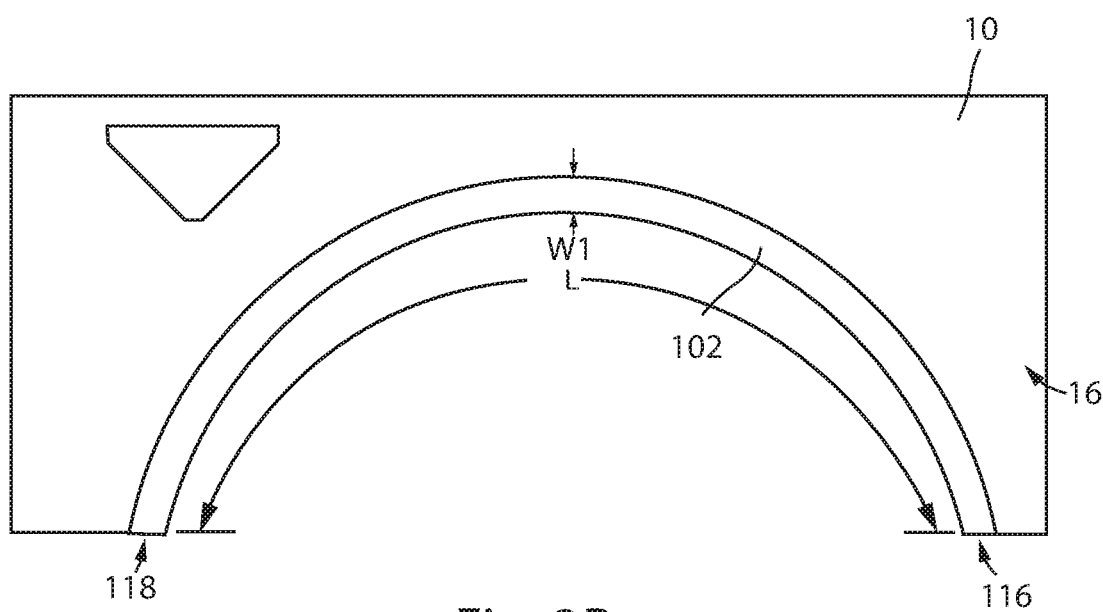
FIG. 3B shows a side elevation view from the outboard side of the fender with the fender flare shown in FIG. 3A installed.

In addition, the use of ordinal numbers, such as first, second, third, etc. is not meant to be limiting in terms of sequence, position, and the like, but rather, a convenient nomenclature for distinguishing similarly named components. Also, the use of positional terms is not meant to be limiting, but rather, a convenient nomenclature for describing the invention. Therefore, positional terms (such as above, below, top or bottom) are used from the perspective of a typical viewer looking at the invention installed on a vehicle from an elevation view as shown in FIGS. 3A and 3B (see, also FIG. 1). Furthermore, reference to approximate measurements is to account for manufacturing tolerances and reasonable human error in taking measurements.

Figure 1:
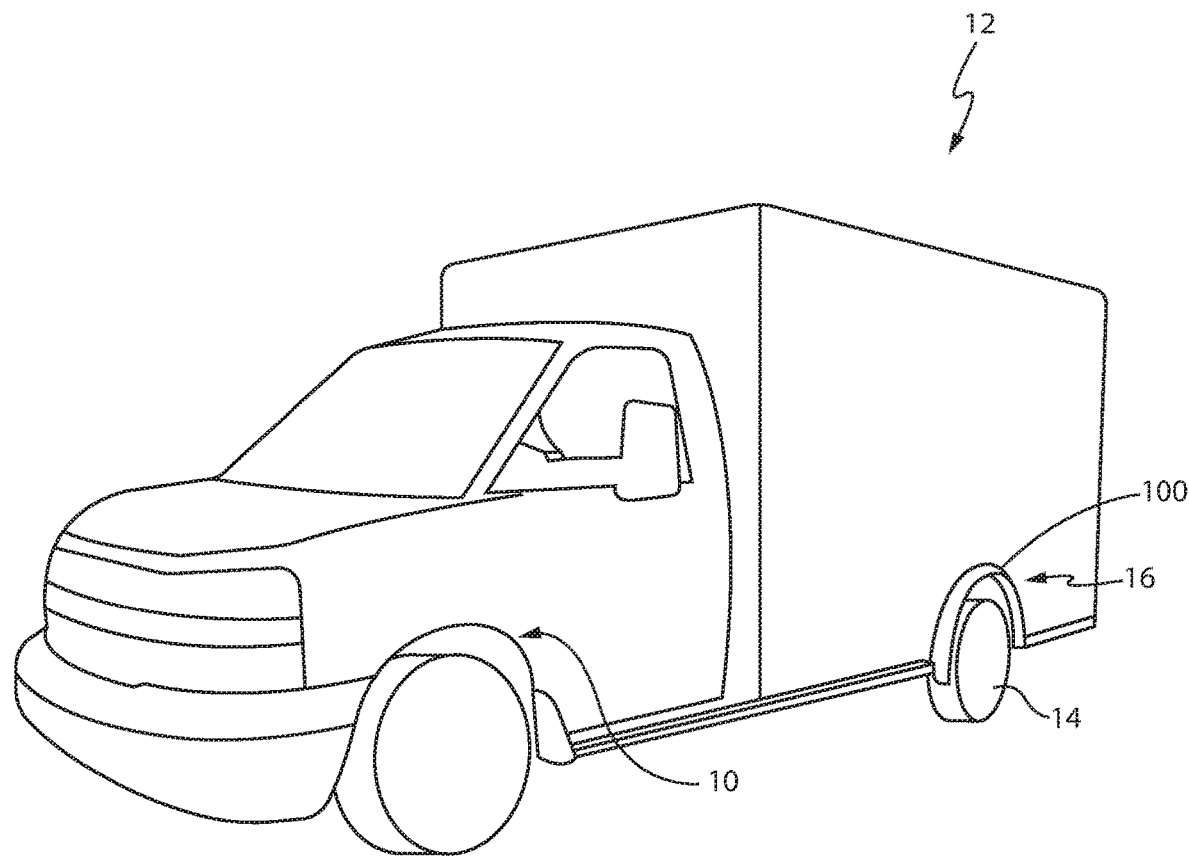
FIG. 1 shows an embodiment of the fender flare installed on a vehicle.

As shown in FIG. 1, a fender 10 of a vehicle 12 is an arc-shaped portion of the vehicle that partially covers approximately the top portion of a wheel 14 of the vehicle 12. The invention of the present application is a fender flare 100 to cover and/or protect the outboard side 16 (or the outer side) of the fender 10. The fender flare 100 of the present invention comprises a flap 102; and a support system 103 operatively connected to the flap 102. The support system 103 is configured to operatively connect the flap 102 to a fender 10 of a vehicle 12. The flap 102 presents an aesthetically pleasing ornamentation to the fender 10 as well as providing protection from foreign objects.

Figure 2:
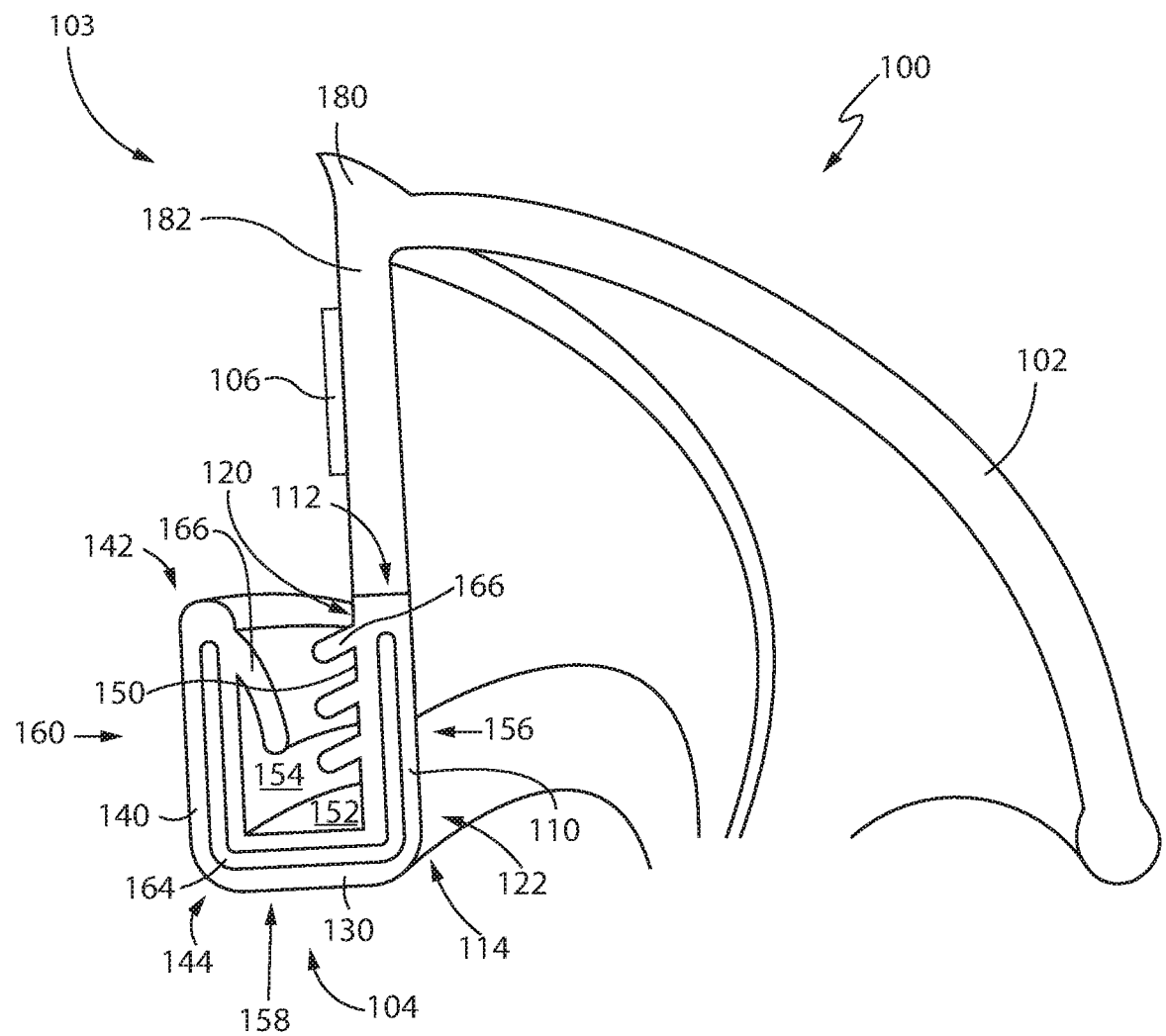
FIG. 2 shows a perspective view of an embodiment of the fender flare.

As shown at least in FIG. 2, the support system 103 can comprise a trim portion or trim 104. In some embodiments, the support system 103 can further comprise an extension 182 above the trim 104. The trim 104 can have or adopt a U-shaped configuration that allows the support system 103 to attach the flap 102 to the fender 10 to eliminate the requirement for drilling holes into the fender 10 for fastening with bolts as in the prior art. In some embodiments, the trim 104 is comprised of a first wall 110 having four ends 112, 114, 116, 118 defining the approximate bounds of two opposing surfaces 120, 122 (see also, FIGS. 3A-3C). When properly installed, one end 112 forms a top arc, and the second end 114 forms a bottom arc opposite the top arc. In embodiments with an extension 182, the top of the extensions defines the top arc. The second and third ends 116, 118 are opposing ends that define the lateral bounds of the top and bottom arc. The four ends 112, 114, 116, 118 define the approximate bounds of the two opposing surfaces 120, 122 of the first wall 110. One surface 120 may be referred to as the inboard side or back side, which attaches to the fender 10. The opposing surface 122 may be referred to as the outboard side or front side. As shown in FIGS. 3A and 3B, the distance from the first end 112 to the second end 114 defines a width W1 of the first wall 110, and the distance from the second end 116 to the third end 118 along the trim 104 defines the length L of the first wall 110.

The first wall 110 has a length L or can be cut to have a length L that is long enough to substantially cover the full extent of the arc of the fender 10. The first wall 110 has a width W1 that is sufficiently wide to provide enough surface area to attach the first wall 110 to the fender 10. Specifically, the inboard surface 120 of the first wall 110 can be attached to the outboard side 16 of the fender 10 causing the flap 102 to project further outwardly away from the fender 10.

Figure 3C:
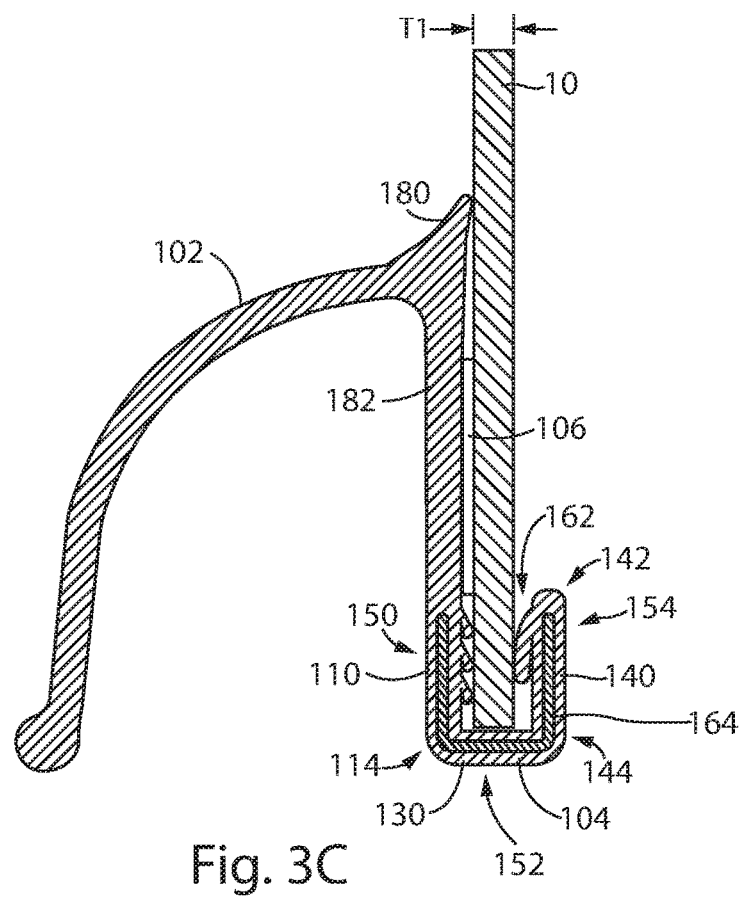
FIG. 3C shows a cross-sectional view of the fender flare installed taken at line 3C-3C shown in FIG. 3A.
Figure 4:
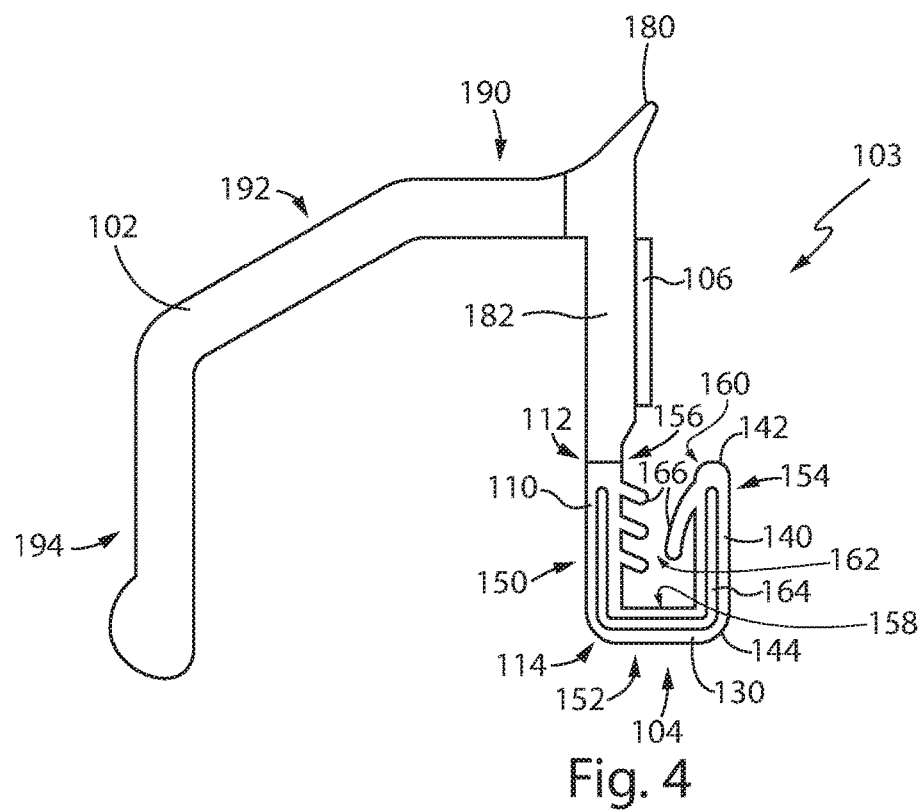
FIG. 4 shows a side view of another embodiment of the fender flare.

As shown in FIGS. 3C and 4, to facilitate proper alignment of the first wall 110 against the fender 10, the trim 104 may comprise a second wall 130. The second wall 130 extends from the first wall 110. In some embodiments, the second wall 130 extends approximately perpendicularly from the second end 114 of the first wall 110. In this manner, an interior side 158 of the second wall 130 can function as a stop during installation of the fender flare 100. The second wall 130 can be pressed upwardly against the bottom edge of the fender 10, then the first wall 110 can be attached to the outboard side 16 of the fender 10. This will allow the fender flare 100 to align with the arching shape of the fender 10.

In some embodiments, the trim 104 may have a U-shaped configuration defined by a first wall 110 having a top arc and a bottom arc opposite the top arc (when installed), a second wall 130 projecting perpendicularly from the bottom arc of the first wall 110, and a third wall 140 having a first end 142 and a second end 144 opposite the first end 142 of the third wall 140, the third wall 140 being substantially parallel to the first wall 110 and substantially perpendicular to the second wall 130. The second wall 130 may be operatively connected to the third wall 140 at the second end 144 of the third wall 140. The first wall 110, second wall 130, and third wall 140 each have an exterior side 150, 152, 154 and an interior side 156, 158, 160 opposite the exterior side 150, 152, 154. The interior sides 156, 158, 160 of the first wall 110, the second wall 130, and the third wall 140 define a channel 162. In use, the user positions the trim 104 such that the channel 162 is at the bottom of the fender 10. The user then slides the trim 104 upwardly so that the fender 10 enters into the channel 162. The trim 104 then holds the fender flare 100 in place by a resistive force, such as a biasing force, gripping force, tension, friction, and the like. In some embodiments, when the fender 10 abuts against the second wall 130, the user fastens the first wall 110 against the outboard side 16 of the fender 10, for example, with a fastener 106.

The trim 104 comprises any combination of a variety of features to facilitate the connection of the trim 104 to the fender 10. In some embodiments, the trim 104 may comprise a carrier 164 embedded in between the interior sides 156, 158, 160 and exterior sides 150, 152, 154 of the first, second, and third walls 110, 130, 140. The carrier 164 may help the trim 104 maintain the integrity of its shape as well as providing a resistive force against the fender 10 when the trim 104 is installed on the fender 10. For example, if the channel 162 is narrower than the thickness T1 of the fender 10, then as the trim 104 is slid up into the fender 10, the first and third walls 110, 140 will be pushed away. Because the carrier 164 attempts to maintain the shape of the trim 104, a biasing force is applied by the first and third walls 110, 140 against the fender 10 creating a gripping action to help hold the trim 104 in place when properly installed on the fender 10. The carrier 164 may be a piece of metal, such as aluminum, steel, and the like. In some embodiments, the carrier 164 may be a strip of metal, such as stamped metal. In some embodiments, the carrier 164 may be a wire carrier.

With reference to FIGS. 3C-5B, in some embodiments, the trim 104 can comprise a plurality of protrusions 166 projecting from the interior sides 156, 160 of the first wall 110 and the third wall 140 into the channel 162. A protrusion 166 comprises a body 168 attached to one of the walls 110, 140 of the trim 104, and a tip 170. The plurality of protrusions 166 increases the resistance between the first and third walls 110, 140 of the trim 104 against the outboard 16 and inboard sides 18 of the fender 10, respectively. Again, a squeezing or gripping action is created with the protrusion 166. As such, the protrusion 166 may have a compressible, yet elastic property, such as of rubber.

Figure 5A:
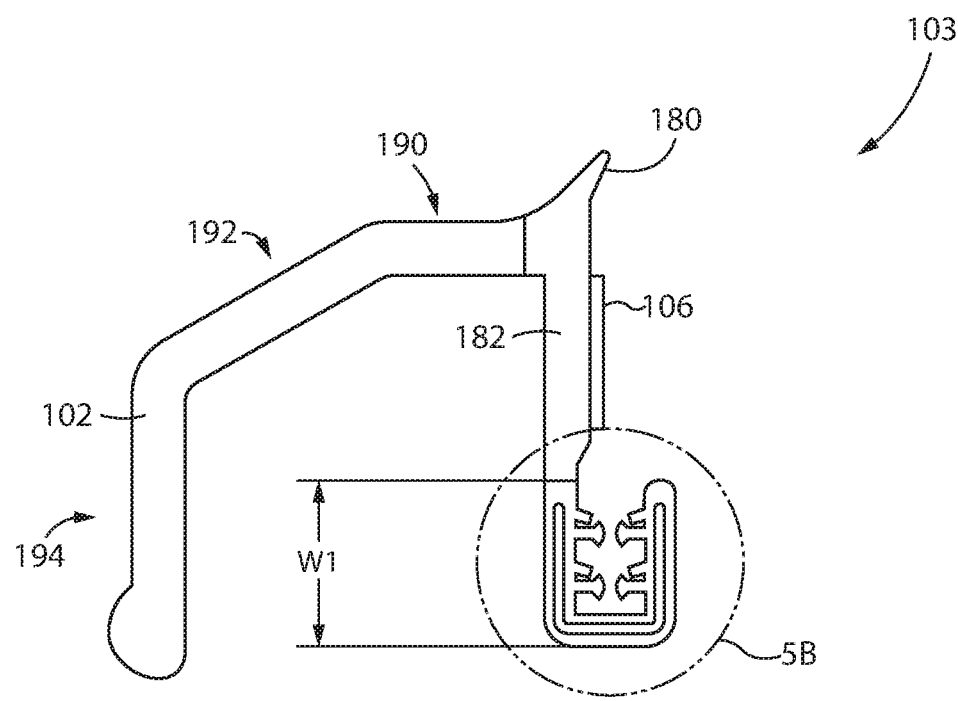
FIG. 5A shows a side view of another embodiment of the fender flare.
Figure 5B:
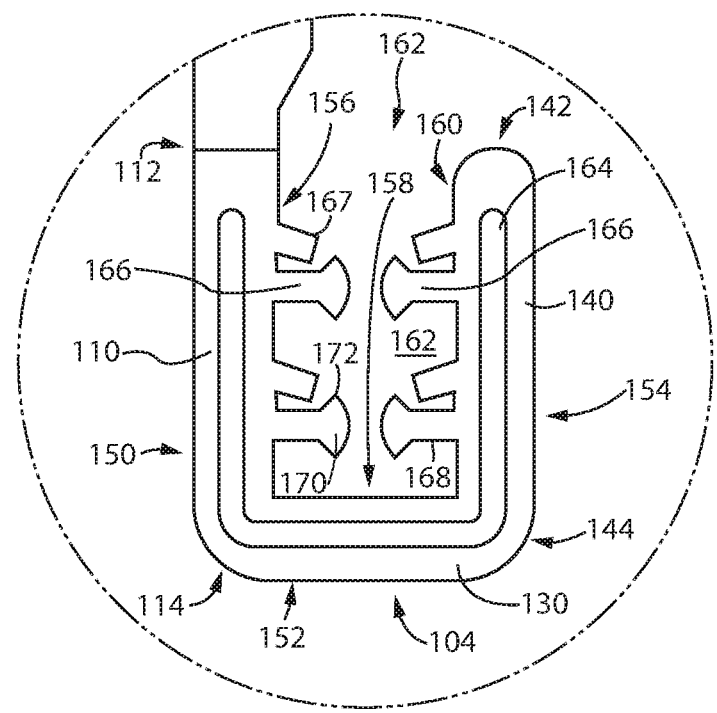
FIG. 5B shows a close-up of the section designated as 5B in FIG. 5A.
Figure 6:
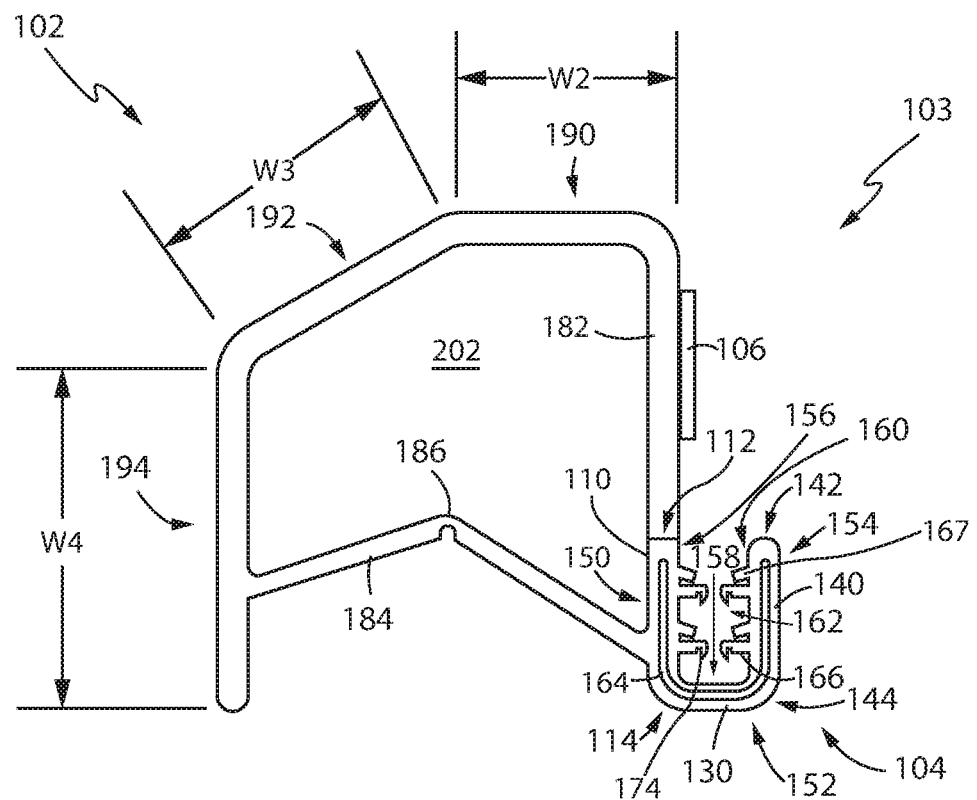
FIG. 6 shows a side view of another embodiment of the fender flare.

The protrusions 166 can protrude perpendicularly from the first and third walls 110, 140 into the channel 162. The protrusions 166 can project uniformly into the channel 162 from the first and third walls 110, 140. In some embodiments, the protrusions 166 can be of uneven length. In some embodiments, the protrusions 166 can have a flange 172 at the tip 170 in which the diameter or width of the tip 170 is wider or larger than the body 168 of the protrusion 166 where the protrusion 166 is attached to the first or third wall 110, 140, as shown in FIG. 5B. In other words, the edges defining the flange 172 extend beyond the surface of the body 168 all around or on one or more sides. In some embodiments, the tip 170 of the protrusion 166 can have a flange in the form of a hook 174 extending perpendicularly to the body 168 of the protrusion 166 towards the second wall 130, as shown in FIG. 6.

In some embodiments, buttresses 167 may protrude interiorly from the interior sides 156, 160 of the first wall 110 and the third wall 140. There may be at least one buttress 167 positioned adjacent to at least one protrusion 166 to obstruct movement of the at least one protrusion 166 in one direction. By way of example only, the figures show that each protrusion 166 may have an associated buttress 167 positioned directly above the respective protrusion 166. The buttresses 167 are shorter than their respective protrusion 166 and are stiffer than the protrusion 166. In addition, the buttresses 167 may be angled towards the second wall 130 or towards their respective protrusion 166. The size, position, and angle of the buttresses 167 relative to their respective protrusion 166 are configured to allow the fender 10 to be inserted into the channel 162 so that the fender 10 encounters resistance with the protrusion 166, but does not make contact with the buttresses 167. Because the protrusions 166 are pliable, the protrusions 166 bend toward the second wall 130 as the fender 10 is inserted into the channel 162. Because the respective buttress 167 is positioned above the respective protrusion 166, the buttress 167 does not obstruct or interfere with the downward movement of the protrusion 166 as the trim 104 is being installed. Once the fender 10 is fully inserted, and the force applied to the trim 104 to insert the fender 10 is removed, gravitational force on the trim 104 will pull the trim 104 downwardly away from the fender 10. This causes the protrusions 166 to move towards the opening of the channel 162 and their respective buttresses 167, or away from the second wall 130. However, due to the positioning of the buttresses 167, movement of the protrusions 166 away from the bottom wall 130 is blocked by their respective buttresses 167, and the trim 104 is unable to slip out by the natural gravitational force of the fender flare 100.

In some embodiments, the buttress 167 need not be angled. The buttress 167 can be any kind of projection from the first wall 110 or the third wall 140 to prevent the protrusion 166 from bending toward the opening of the channel 162, but allowing the protrusions 166 to bend towards the second wall 130. Thus, the buttresses 167 obstruct movement of their respective protrusions 166 in one direction only. The buttresses 167 can also be far enough away from any other protrusion 166 (i.e. protrusions that are not the respective protrusion of a given buttress) so as not to interfere with the movement of those non-respective protrusions in any direction.

Figure 7A:
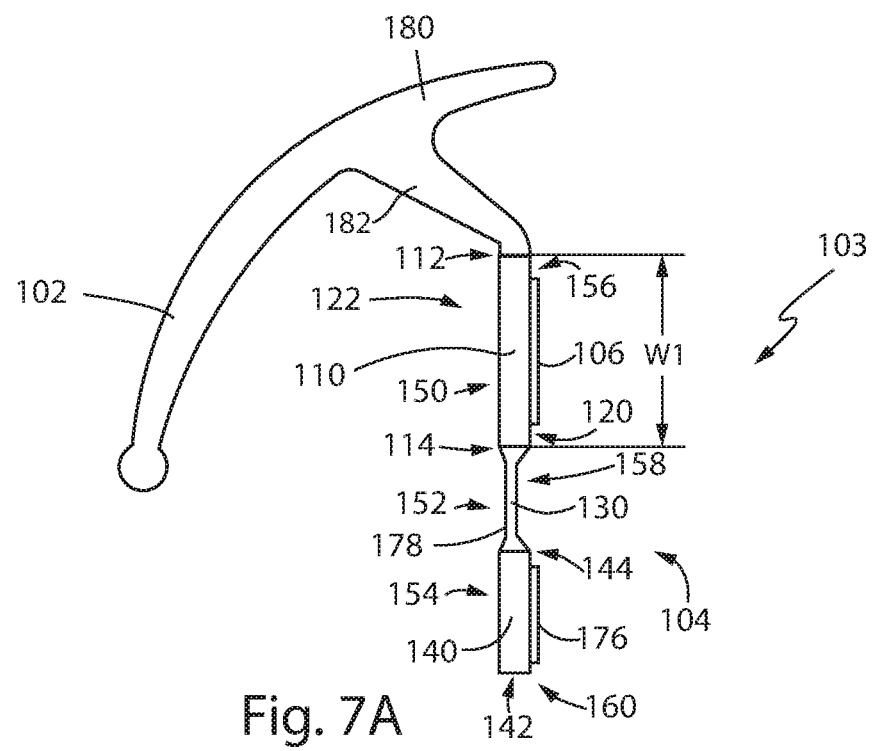
FIG. 7A shows a side view of another embodiment of the fender flare.
Figure 7B:
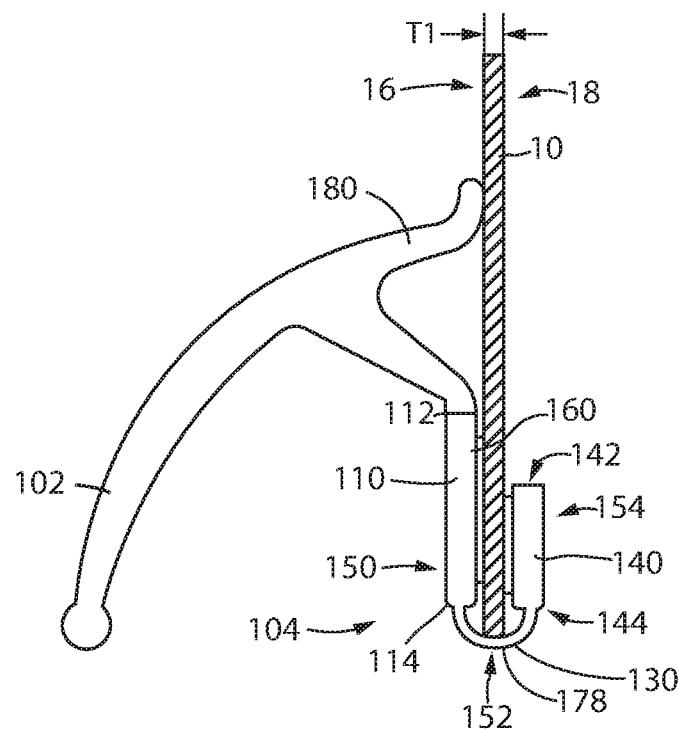
FIG. 7B shows the fender flare shown in FIG. 7A installed on a fender.

In some embodiments, as shown in FIGS. 7A and 7B, in lieu of the protrusions 166, one or more fasteners 106, 176 may be used to facilitate attaching the trim 104 to the fender 10. The fasteners 106, 176 can be any type of fastener, such as nuts and bolts, screws, nails, staples, clips, magnets, adhesives, and the like. Preferably, the fasteners 106, 176 are non-penetrating fasteners, such as clips, magnets, adhesives and the like. Non-penetrating fasteners are preferred because of the reduced likelihood of intentionally causing damage to the fender 10 as would be likely when using penetrating fasteners. Penetrating fasteners, such as screws, bolts, nails, staples and the like require the creation of holes through the fender 10. This increases the likelihood of developing rust at the point of penetration as well as reducing the integrity of the fender 10.

Preferably, the fasteners 106 are adhesives. The adhesive may be a liquid applied to the trim 104 for attaching to the fender 10. In some embodiments, the adhesive may be a tape, such as a weather strip tape having double sided adhesive so that the tape may be adhered to the first wall 110 on one side of the foam core, while the opposite side of the foam core remains available to adhere to the fender 10. The fasteners 106, 176 may be applied substantially along the full length of the first wall 110 and/or the third wall 140. Preferably, one fastener 106 is positioned on the first wall 110 directly opposite where the flap 102 attaches to the support system 103. This arrangement provides added support to the flap 102. Because the preferred fasteners 106, 176 do not require drilling holes into the fender 10, the fender flare 100 can be installed much faster than prior art devices.

In some embodiments, operatively connected to the first wall 110 of the trim 104 may be a first fastener 106 to facilitate attachment to the fender 10. In some embodiments, a second fastener 176 may be applied to the third wall 140 of the trim 104. Therefore, the first wall 110 may be adhered to the outboard side 16 of the fender 10, and the third wall 140 may be adhered to the inboard side 18 of the fender 10. The dual adhesive significantly increases the grip strength of the trim 104. In embodiments utilizing a dual adhesive, the second wall 130 operatively connecting the first wall 110 to the third wall 140 may be flexible so as to form a hinge 178, such as a living hinge, between the first wall 110 and the third wall 140 of the trim 104 as shown in FIGS. 7A and 7B. In use, the first wall 110 can be adhered to the outboard side 16 of the fender 10. The second wall 130 can be bent or flexed thereby positioning the third wall 140 against the inboard side 18 of the fender 10 where the third wall 140 can be adhered to the inboard side 18 of the fender 10. This operation can be done in the reverse direction as well, adhering the third wall 140 to the inboard side 18 of the fender 10 first, then adhering the first wall 110 to the outboard side 16 of the fender 10.

In some embodiments, the support system 103 may have an extension 182 that connects the trim 104 to the flap 102. As such, the extension 182 can project from the first end 112 of the first wall 110, and extend in line with the first wall 110, effectively increasing the height of the first wall 110. As such, the extension 182 effectively becomes a part of the first wall 110 and the free end or top of the extension 182 effectively becomes the top arc of the fender flare 100. In some embodiments, the extension 182 may be integrally formed as part of the first wall 110. In some embodiments, the extension 182 may be a separate part operatively connected to the first wall 110. The extension 182 may be co-extruded with the first wall 110 so as to be formed as part of the first wall; however, by using co-extrusion techniques, the extension 182 can be made of different material, hardness, or flexibility compared to the first wall 110.

Figure 8A:
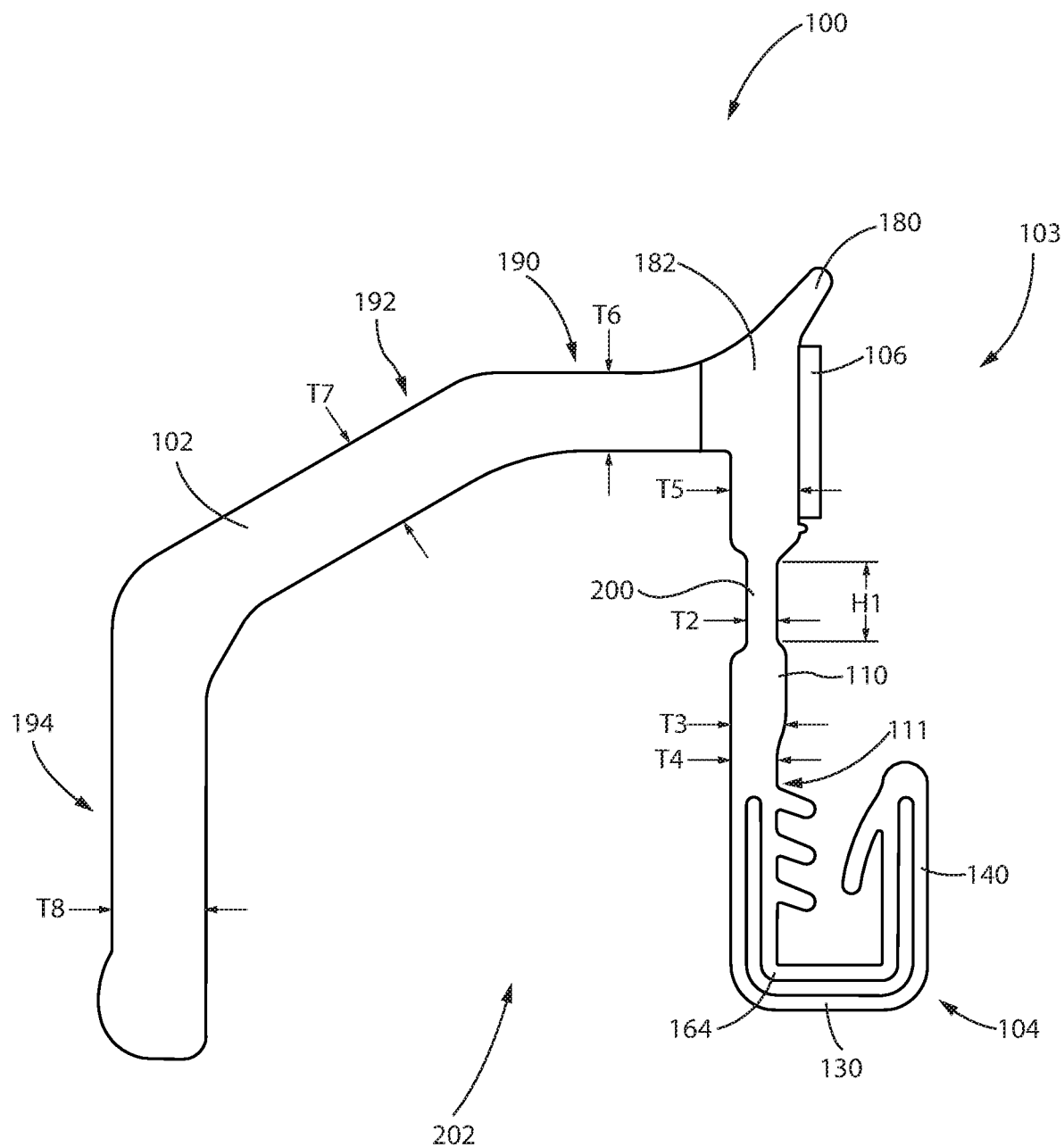
FIG. 8A shows a side view of another embodiment of the fender flare.

Utilizing an extension 182 increases the surface area of the first wall 110, thereby increasing the ability to secure the fender flare 100 to the fender 10. For example, a fastener 106 may be operatively connected to the extension 182 in a manner that allows the extension 182 to be fastened to the outboard side 16 of the fender 10 via the fastener 106 when the fender flare is properly installed. In some embodiments, the fastener 106 is an adhesive, such as weather stripping. Preferably, the fastener 106 is positioned on the extension 182 directly opposite where the flap 102 attaches to the extension 108 as shown in FIG. 8A. This arrangement provides added support to the flap 102.

In some embodiments, the support system 103 may comprise a trim 104 having a first, second, and third wall 110, 130, 140, and an extension 182 extending from the first wall 110 of the trim 104. The first, second, and third walls 110, 130, 140 define a channel 162. Any combination of fasteners 106, 176, a carrier 164, and protrusions 166 can be utilized to secure the fender flare 100 to the fender 10. In some embodiments, protrusions 166 may protrude into the channel 162 from the first and second walls 110, 140 for grip. In some embodiments, a carrier 164 may be embedded in the first, second, and third walls 110, 130, 140. In embodiments in which protrusions 166 are utilized, the fastener 106 may be applied to the extension 182. In embodiments in which protrusions 166 are not used, the first wall 110, the second wall 130, the third wall 140, or any combination thereof can have a fastener 106, 176. Utilizing the fasteners 106, 176, carrier 164, and protrusions 166 would maximize securement.

As shown in FIGS. 8A-8F, in any of the embodiments described herein, the support system 103 can have a thinned segment 200 to alleviate stress within the support system 103 caused during bending of the support system 103 to conform to the shape of the fender 10. When the support system 103 is bent to conform to the shape of the fender 10, the stress created in the support system 103 caused by bending can be transferred to the flap 102 causing the flap 102 to have a buckling or puckering effect, which can be aesthetically unappealing. With time this buckling or puckering effect eventually settles, creating a smooth, aesthetically pleasing look. However, by thinning out a portion of the support system 103, the thinned portion 200 absorbs the stress, thereby alleviating the buckling or puckering effect in the flap 102 immediately.

Figure 8B:
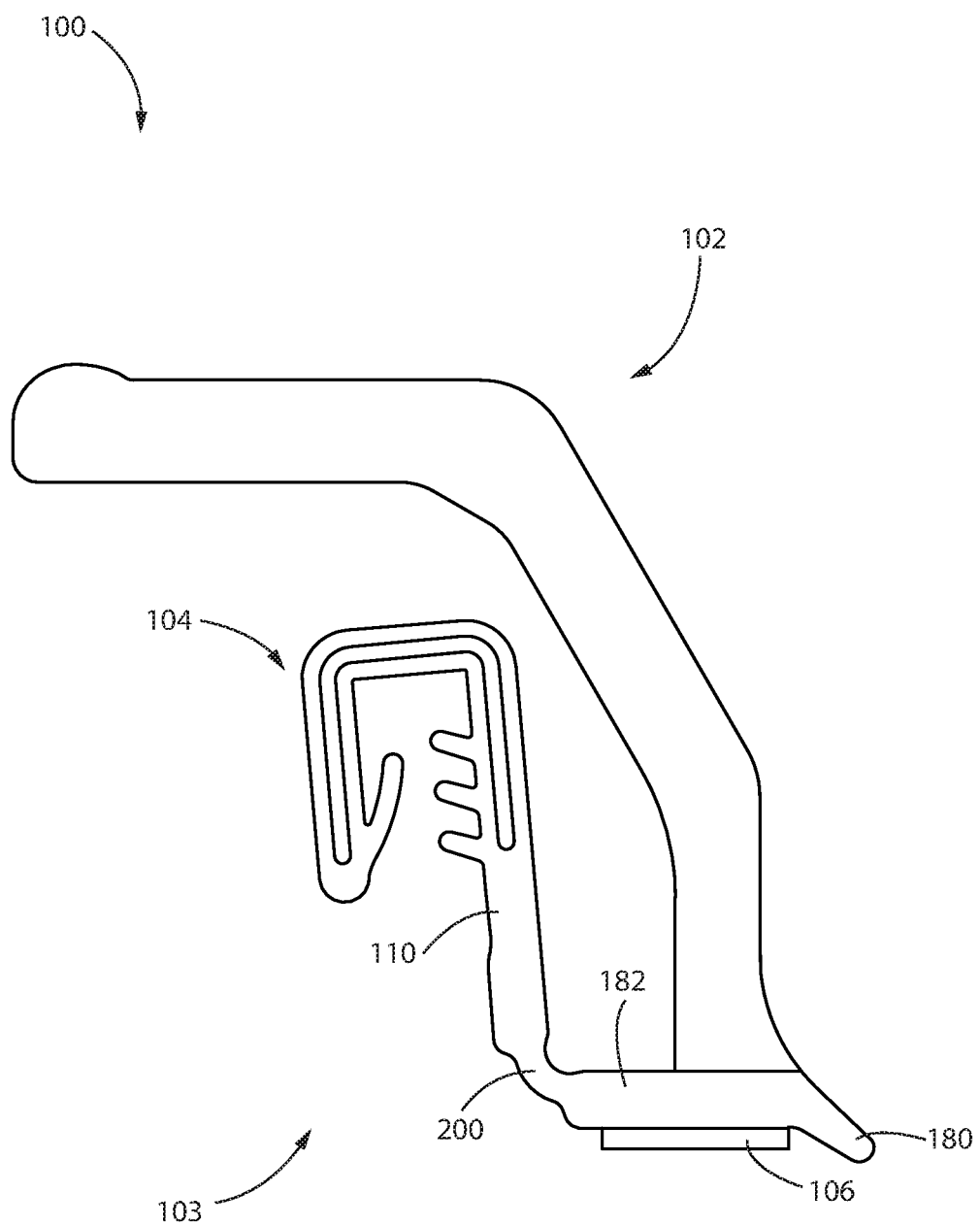
FIG. 8B shows a side view of the embodiment shown in FIG. 8A with the trim tucked under the flare for packaging.
Figure 8C:
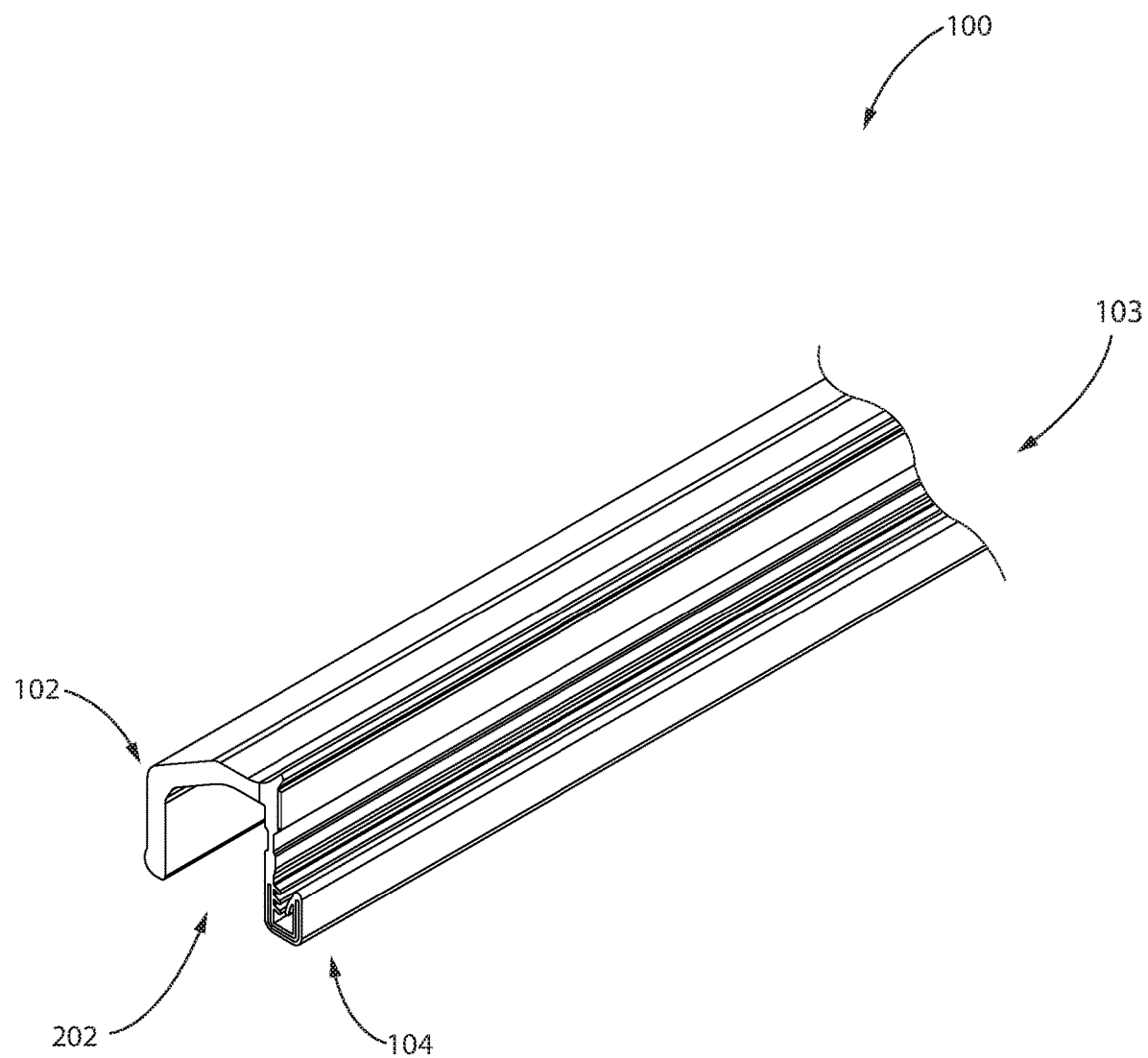
FIG. 8C shows a perspective view of the embodiment shown in FIG. 8A.
Figure 8D:
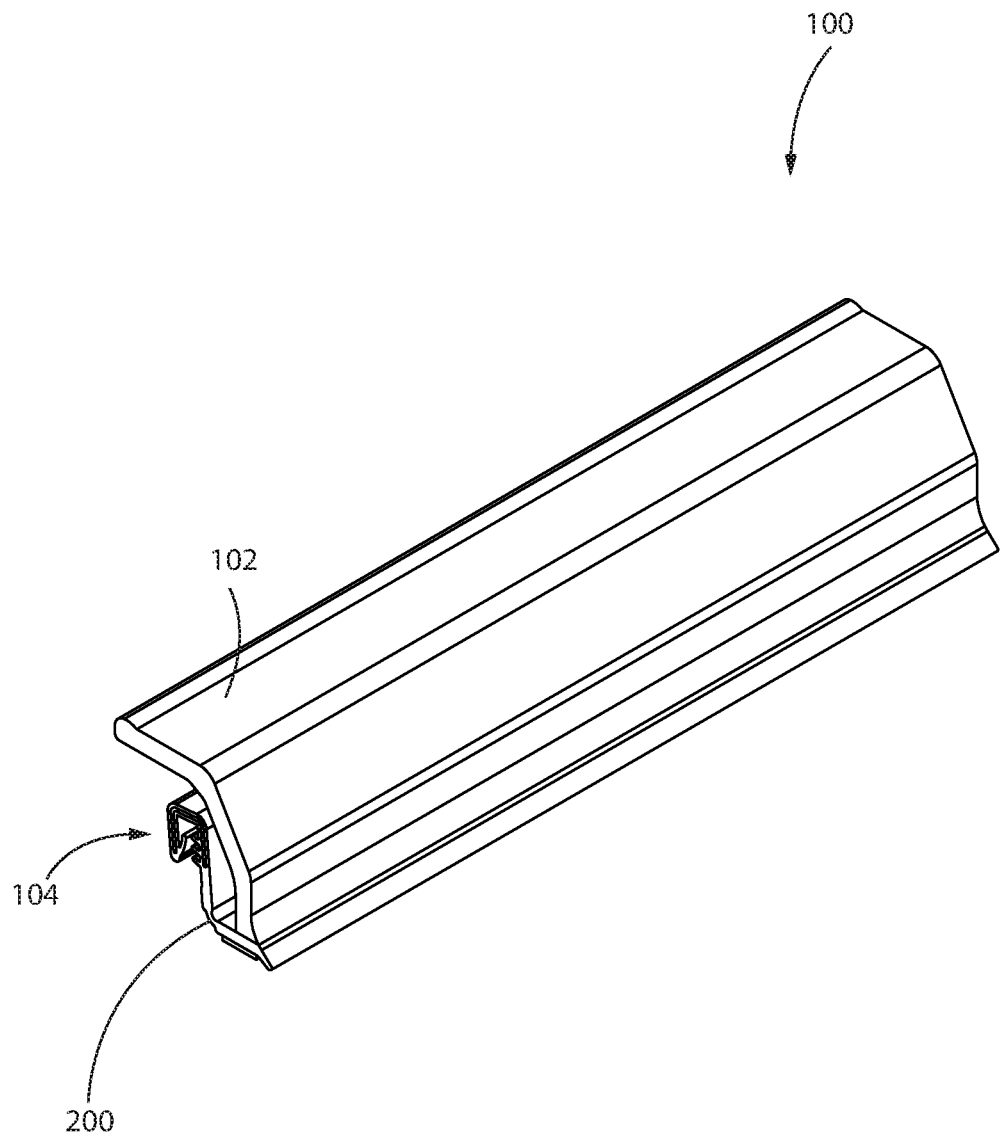
FIG. 8D shows a perspective view of the embodiment shown in FIG. 8A with the trim tucked under the flare for packaging.
Figure 8E:
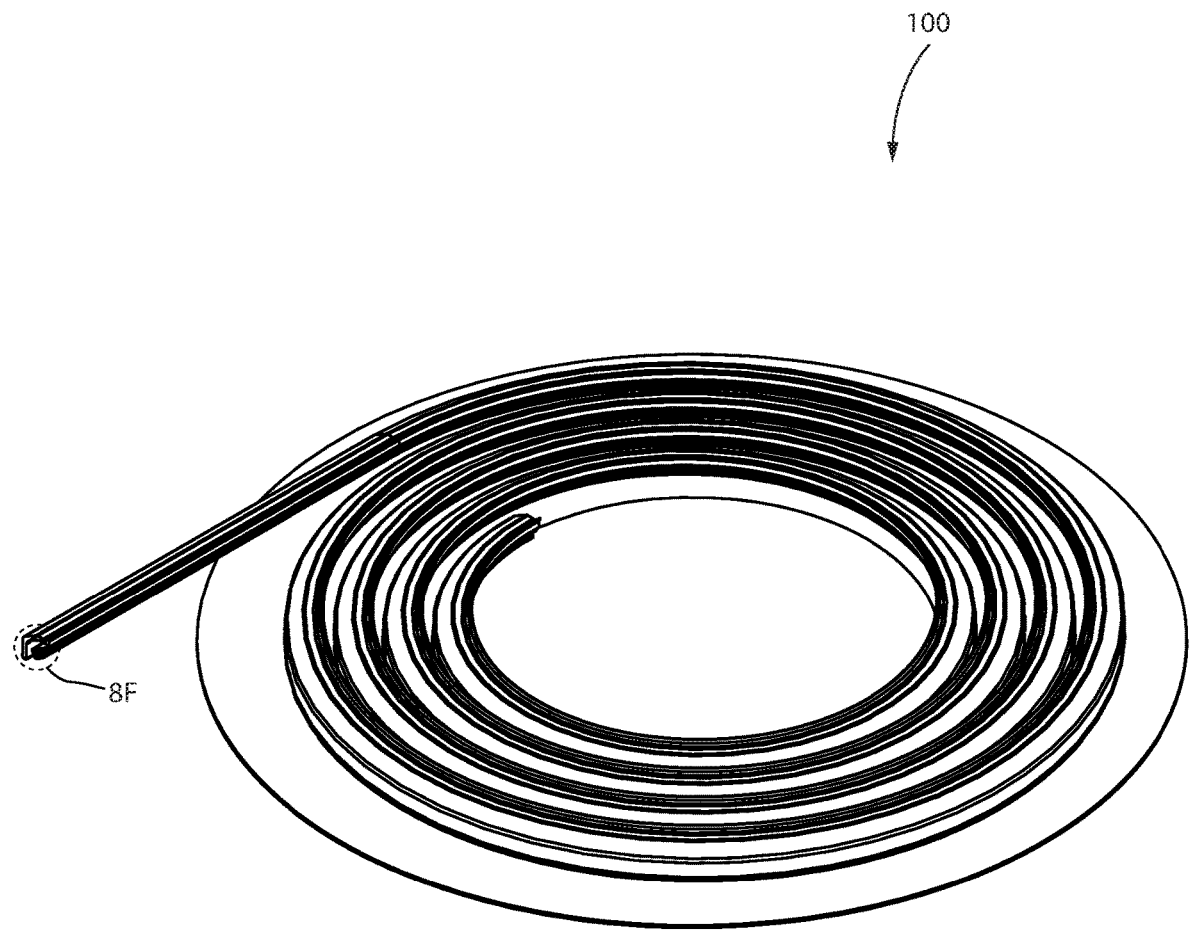
FIG. 8E shows a perspective view of the embodiment shown in FIG. 8A with the trim tucked under the flare and coiled up for packaging.
Figure 8F:
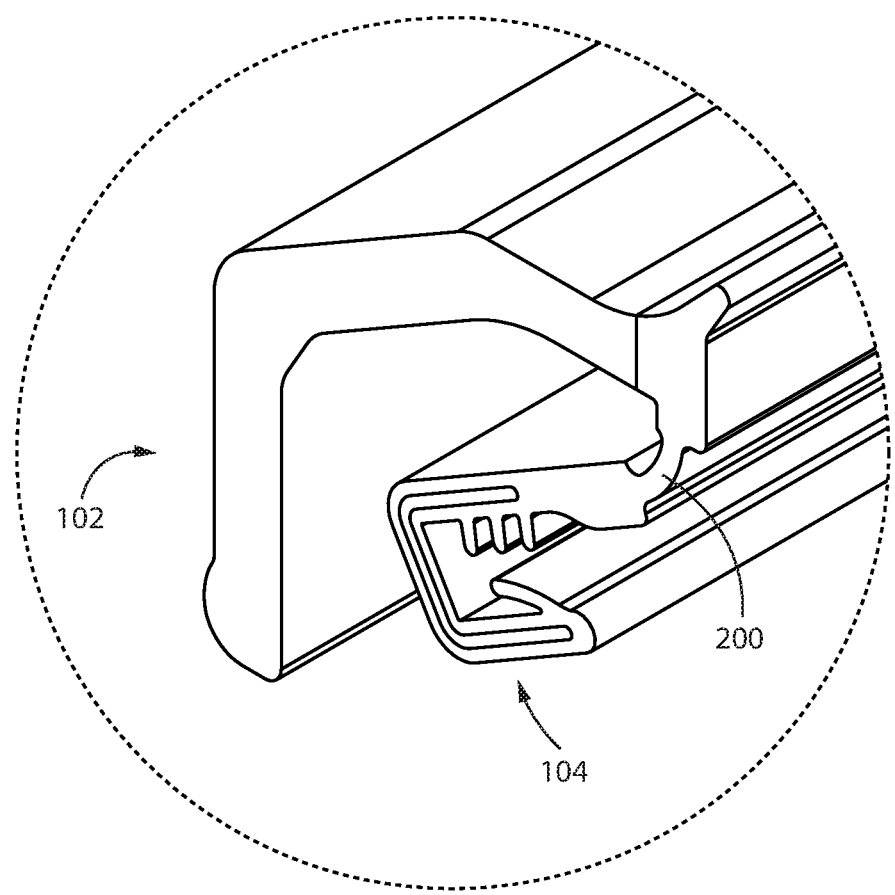
FIG. 8F shows a close-up of the section designated as 8F in FIG. 8E.
Figure 9A:
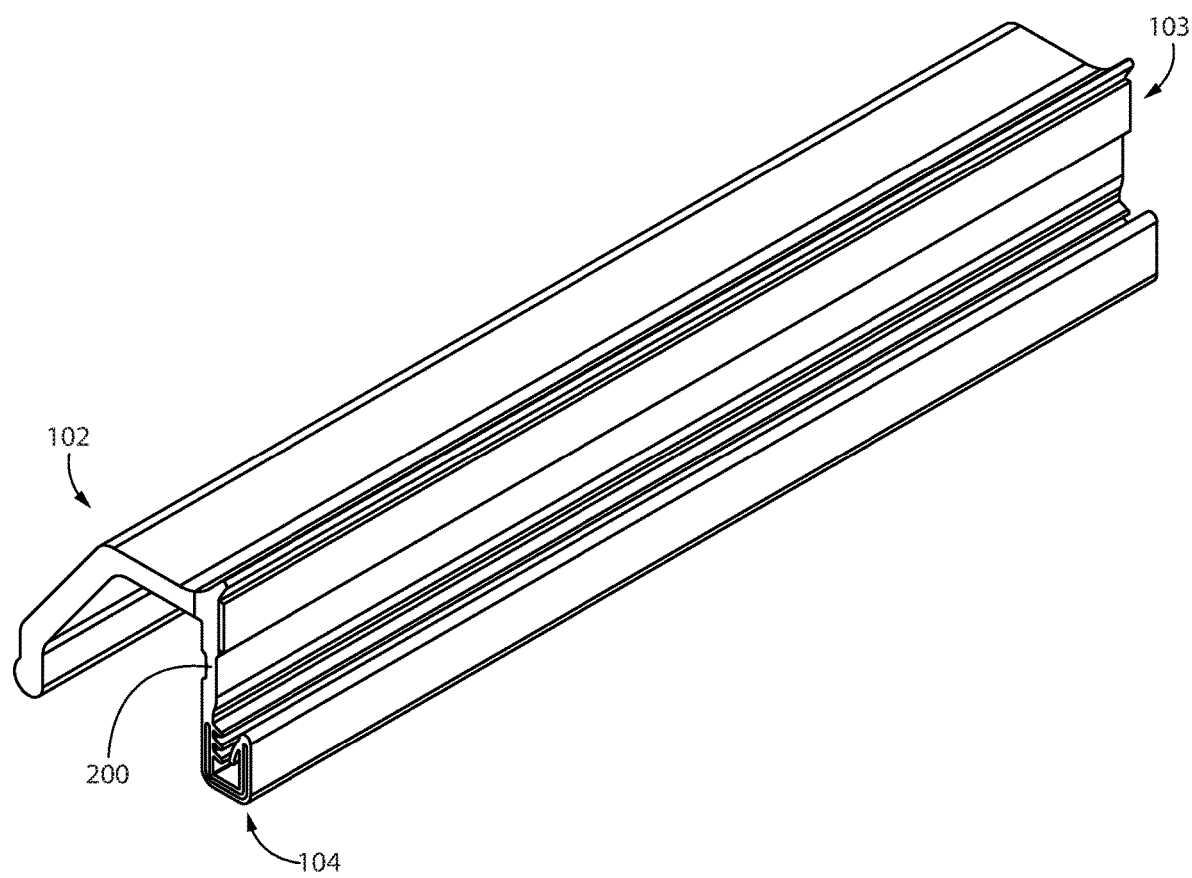
FIG. 9A shows a perspective view of another embodiment of the present invention.
Figure 9B:
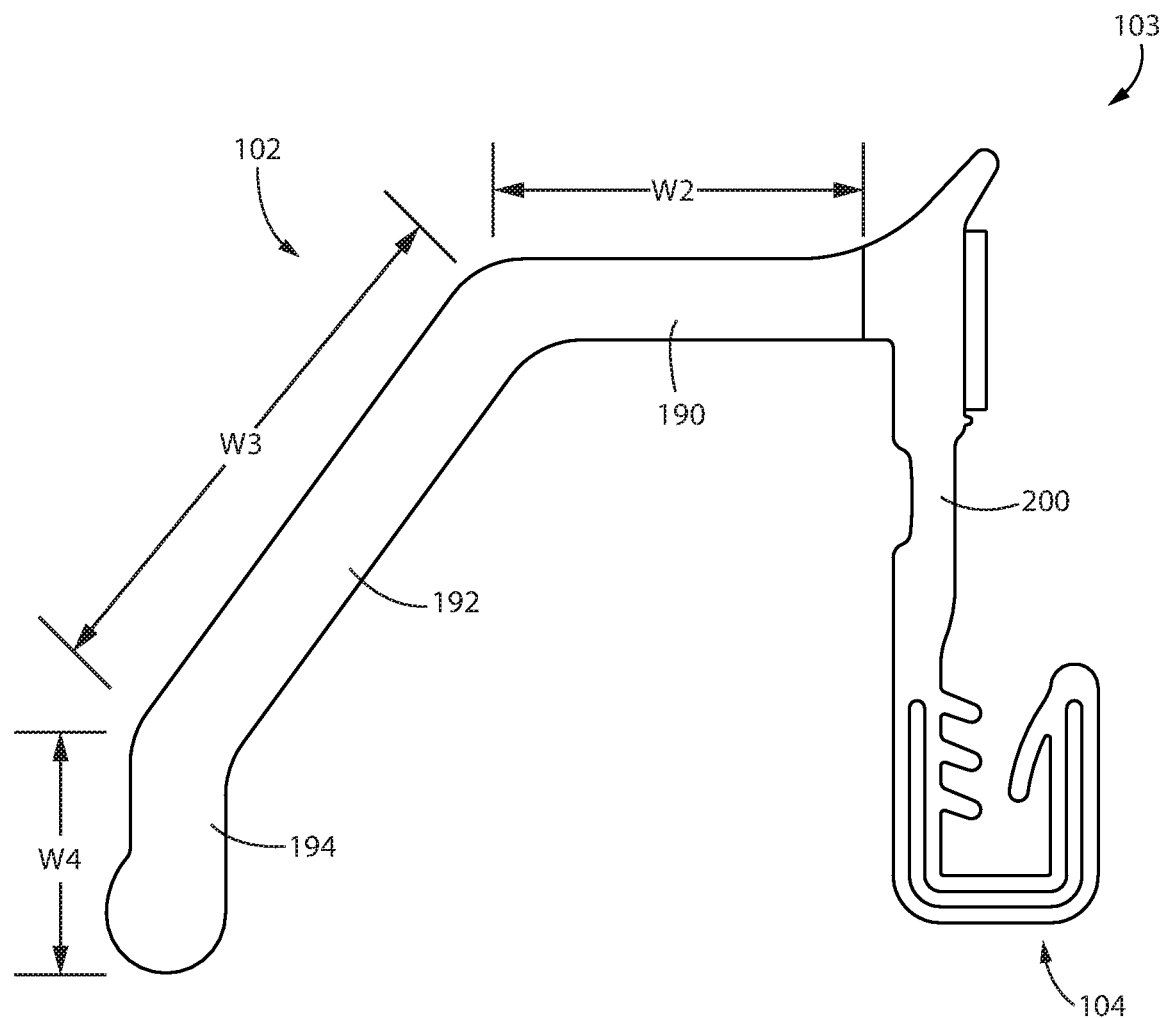
FIG. 9B shows a side view of the embodiment shown in FIG. 9A.

Another advantage of the thinned segment 200 on the support system 103 is that the thinning allows the thinned segment 200 to function as a living hinge. The thinned segment 200, therefore, bends allowing the trim 104 to move relative to the flap 102. Thus, the trim 104 can be moved into the original pocket 202 created by the flap 102 and the support system 103 by bending the trim towards the flap 102 as shown in FIGS. 8B and 8D. Tucking the trim into the pocket 202 created by the flap 102 and support system 103 allows for the fender flare 100 to be rolled or coiled up into a smaller package, as shown in FIG. 8E, for easier shipping and storage.

The thinned segment 200 is positioned in between the trim 104 and the flap 102. Preferably, the thinned segment 200 is generally in-line with the first wall 110 of the trim 104. In other words, the thinned segment 200 can lie within a plane defined by the first wall 110. For example, the first wall 110 may taper from both of the opposing surfaces 120, 122 directly into the thinned segment 200 moving upwardly in a direction further away from the first end 112 of the first wall 110. Thus, the first surface 120 and the second surface 122 of the first wall 110 can converge towards each other as they merge into the thinned segment 200 as shown in FIG. 8A. In some embodiments, only one of the surfaces 120, 122 can converge towards the other as shown in FIGS. 9A-11B. Regardless, the thinned segment 200 is positioned above the trim 104 when viewed in elevation view. Thus, the thinned segment 200 can be characterized as being a transition between the trim 104 and the flap 102. As such, the thinned segment 200 can be characterized as being along the first wall 110, for example, as part of the first wall 110, part of the extension 182 or a transition between the first wall 110 and the extension 182.

The thinned segment 200 can have a thickness T2 that is approximately 25% to approximately 90% the thickness T3 of the first wall 110. Preferably, the thickness T2 of the thinned segment 200 is approximately 30% to approximately 75% the thickness T3 of the first wall 110. More preferably, the thickness T2 of the thinned segment 200 is approximately 40% to 60% the thickness T3 of the first wall 110. For example, in some embodiments, the thinned segment 200 can have a thickness T2 of approximately 0.05 inch to approximately 0.15 inch. Preferably, the thinned segment 200 can have a thickness T2 of approximately 0.07 inch to approximately 0.10 inch. More preferably, the thinned segment 200 can have a thickness T2 of approximately 0.08 inch to approximately 0.09 inch. The thinned segment 200 can have a height H1 of approximately 0.100 inch to approximately 1 inch. Preferably, the thinned segment 200 can have a height H1 of approximately 0.2 inch to approximately 0.75 inch. More preferably, the thinned segment 200 can have a height H1 of approximately 0.275 inch to approximately 0.50 inch. In some embodiments, the thinned segment 200 can have a height H1 of approximately 0.2 inch to approximately 0.275 inch. The hardness of the thinned segment 200 can be approximately 40 to approximately 90 Shore A. Preferably, the hardness of the thinned segment 200 can be approximately 50 to approximately 80 Shore A. Most preferably, the hardness of the thinned segment 200 can be approximately 60 to approximately 70 Shore A.

The first wall 110 can have a thickness T3 of approximately 0.10 inch to approximately 0.15 inch. Preferably, the thickness T3 of the first wall is approximately 0.13 inch. In some embodiments, as the first wall 110 progresses from the thinned segment 200 to the channel 162 of the trim 104, the first wall 110 tapers into a lead-in 111. The thickness T4 of the lead-in 111 can range from approximately 0.05 inch to approximately 0.14 inch. Preferably, the lead-in 111 has a thickness T4 of approximately 0.08 inch to approximately 0.12 inch. More preferably, the lead-in 111 has a thickness T4 of approximately 0.10 inch. After the lead-in 111, the thickness of the first wall 110, the second wall 130, and the third wall 140 can be the same. In embodiments in which the second wall 130 functions as a hinge, the thickness of the second wall 130 can be less than the thickness of the first wall 110 and the third wall 140.

In some embodiments, the extension 182 can have a thickness T5 ranging from approximately 0.10 inch to approximately 0.20 inch. Preferably, the thickness T5 of the extension 182 can be approximately 0.13 inch to approximately 0.17 inch. More preferably, the thickness T5 of the extension 182 is approximately 0.15 inch. Thus, in some embodiments, the thickness of the support system 103 can taper from the extension 182 to the thinned segment 200, then expand moving from the thinned segment 200 to the first wall 110, then taper again as the first wall 110 begins to form the channel 162.

In some embodiments, the fender flare 100 may comprise a seal 180 positioned between the flap 102 and the support system 103. Preferably, the seal 180, the flap 102, and the support system 103 can be co-extruded or tri-extruded. If the fender flare 100 has an extension 182, then the seal 180 may be positioned on the extension 182. If the fender flare 100 does not have an extension 182, then the seal 180 may be positioned on the first wall 110 of the trim 104. When the fender flare 100 is properly installed, the seal 180 creates a tight contact with the fender 10 of the vehicle 12 above the support system 103 to reduce or prevent water, dust, and debris from entering into the support system 103. As such, in embodiments with the seal 180, the seal effectively becomes the top arc of the fender flare 100. The seal 180 also hides the fastener 106.

In some embodiments, the fender flare 100 may comprise a stabilizer 184 operatively connecting the flap 102 to the trim as shown in FIG. 6. The stabilizer 184 may impart a biasing force against the flap 102 and the support system 103 to keep the flap 102 stationary and/or away from the support system 103. In some embodiments, the stabilizer 184 may be bendable to allow the flap 102 to be positioned closer to the support system 103, for example, during packaging. During installation and use, however, the stabilizer 184 may force the flap 102 away from the support system 103 to create the aesthetic appeal. The stabilizer 184 can be made bendable by using a flexible material, for example, in the shape of an arc. In some embodiments, the stabilizer 184 can be made bendable by incorporating a hinge 186 into the stabilizer 184. In some embodiments, the hinge 186 may be a living hinge. The stabilizer 184 can be positioned in the pocket 202 between the flap 102 and the support system 103, such that the stabilizer 184 is hidden from plain sight at typical viewing angles (i.e. elevation view) when the fender flare 100 is installed.

The flap 102 provides the aesthetic and protective feature of the fender flare 100. In some embodiments, the flap 102 may be curved. In some embodiments, the flap 102 may be faceted (i.e. have a faceted appearance). For example, the flap 102 can have 3 or more flat surfaces 190, 192, 194 connected to each other. The connections described herein can be an integrally formed connection in which the flap 102 is still a single, integrally formed flap rather than multiple, separate pieces fastened together, or separate pieces fastened together. In some embodiments, the first or proximal surface 190 operatively connected to the first wall 110 or the extension 182 may be perpendicular to the first wall 110. A second or middle surface 192 projecting from the first surface 190 may project downwardly at an oblique angle to the first surface 190. A third or terminal surface 194 projecting downwardly from the second surface 192 may be parallel to the first wall 110. Many other configurations can be used to achieve the desired aesthetics, including a non-faceted, smoothly curved face.

In some embodiments, the first surface 190 can have a width W2 (as measured from the connection to the first wall 110 or extension 182 to the connection to the second surface 192) ranging from approximately 0.375 inch to approximately 0.5 inch. The second surface 192 can have a width W3 (as measured from the connection to the first surface 190 to the connection to the third surface 194) of approximately 0.75 inch to approximately 1.0 inch. The third surface 194 can have a width W4 (as measured from the connection to the second surface 192 to its free terminal end) of approximately 0.5 inch to approximately 1.0 inch.

In some embodiments, the size of the flat surfaces can be optimized to prevent to reduce or eliminate the buckling or puckering effect described above. For example, with reference to FIGS. 9A and 9B, in some embodiments, the width W4 of the terminal surface 194 can be shorter than the width W3 of the middle surface 192. For example, the terminal surface 194 can be approximately 20% to approximately 50% of the width of the middle surface 192. In some embodiments, the width W4 of the terminal surface 194 can be approximately 25% to approximately 40% of the width W3 of the middle surface 192. For example, the terminal surface 194 can have a width W4 of approximately 0.25 inch to approximately 0.5 inch. The middle surface 192 can have a width W3 of approximately 1 inch to 1.25 inch. The proximal surface 190 can have a width of approximately 0.5 inch to approximately 0.8 inch.

Figure 10A:
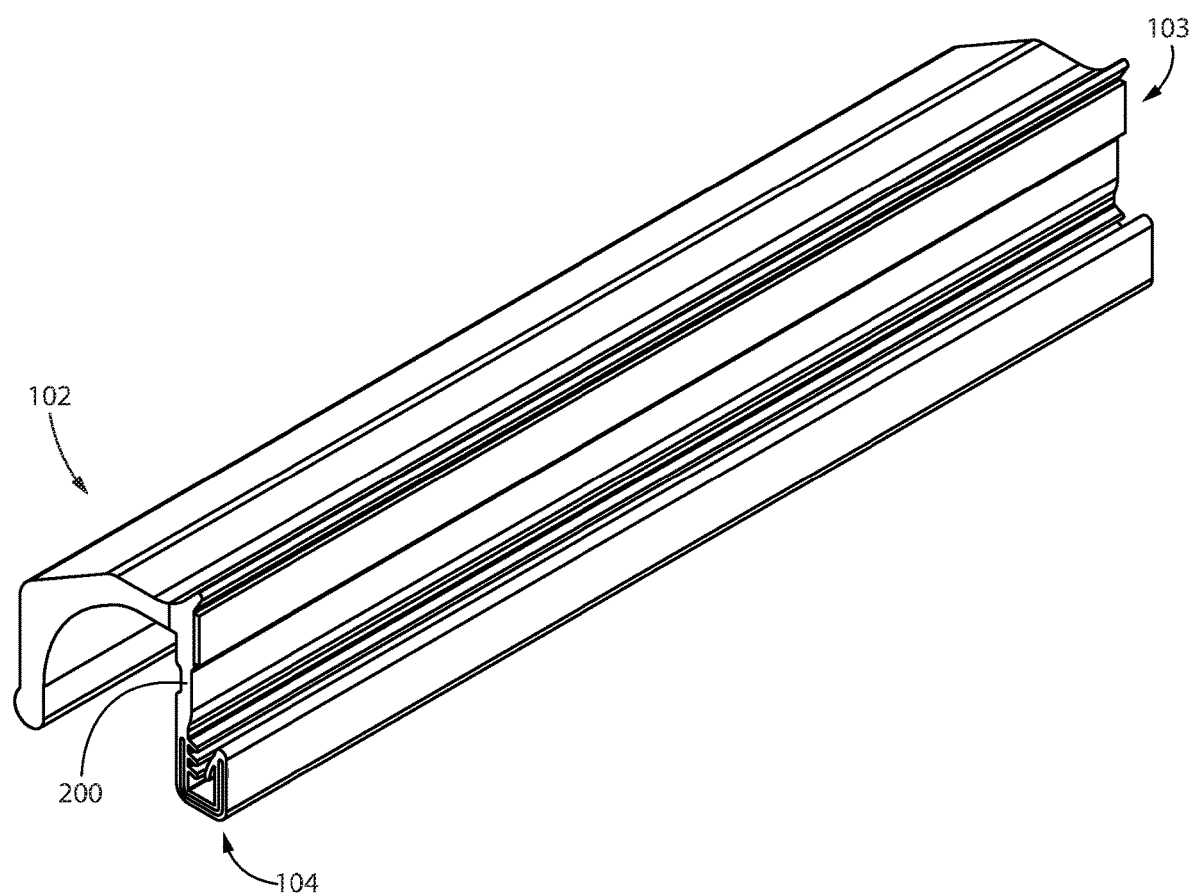
FIG. 10A shows a perspective view of another embodiment of the present invention.
Figure 10B:
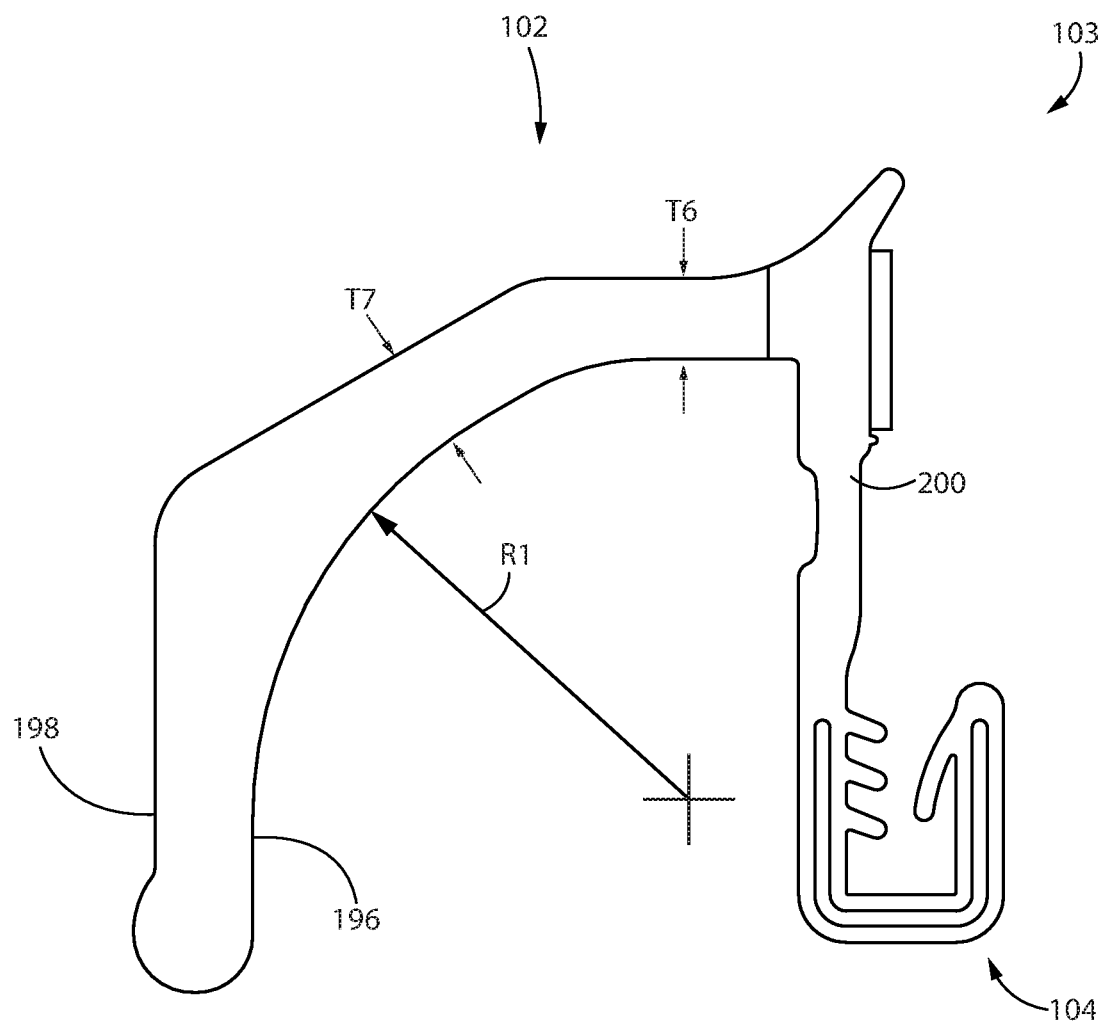
FIG. 10B shows a side view of the embodiment shown in FIG. 10A.

With reference to FIGS. 10A and 10B, in some embodiments, rather than changing the size of the flat surfaces to reduce the buckling effect, the inner surface 196 of the flap 102 can be curved rather than faceted. Therefore, the outer surface 198 of the flap 102 can still have the faceted appearance while the inner surface 196 of the flap 102 is curved. For example, the inner surface 196 of the flap 102 can have a radius of curvature R1 ranging from approximately 0.9 inch to approximately 1 inch.

Figure 11A:
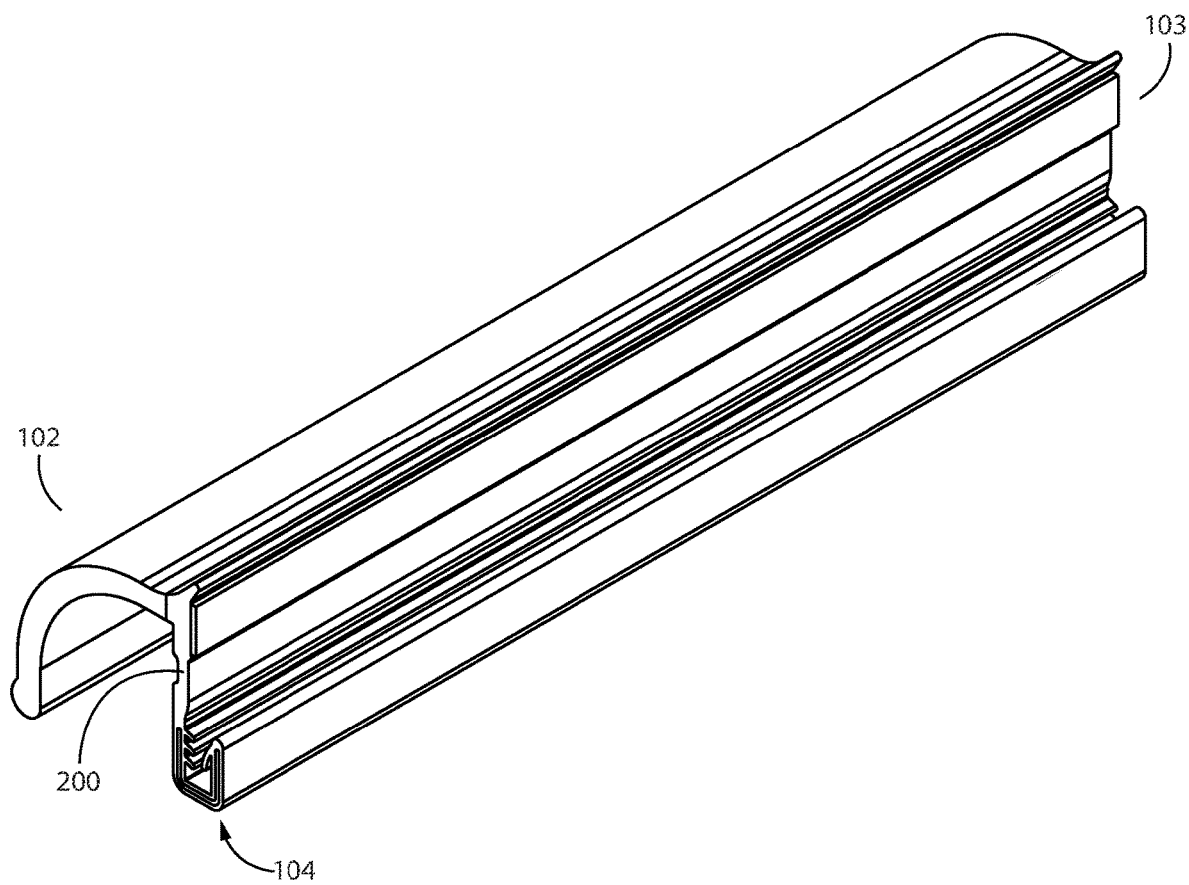
FIG. 11A shows a perspective view of another embodiment of the present invention.
Figure 11B:
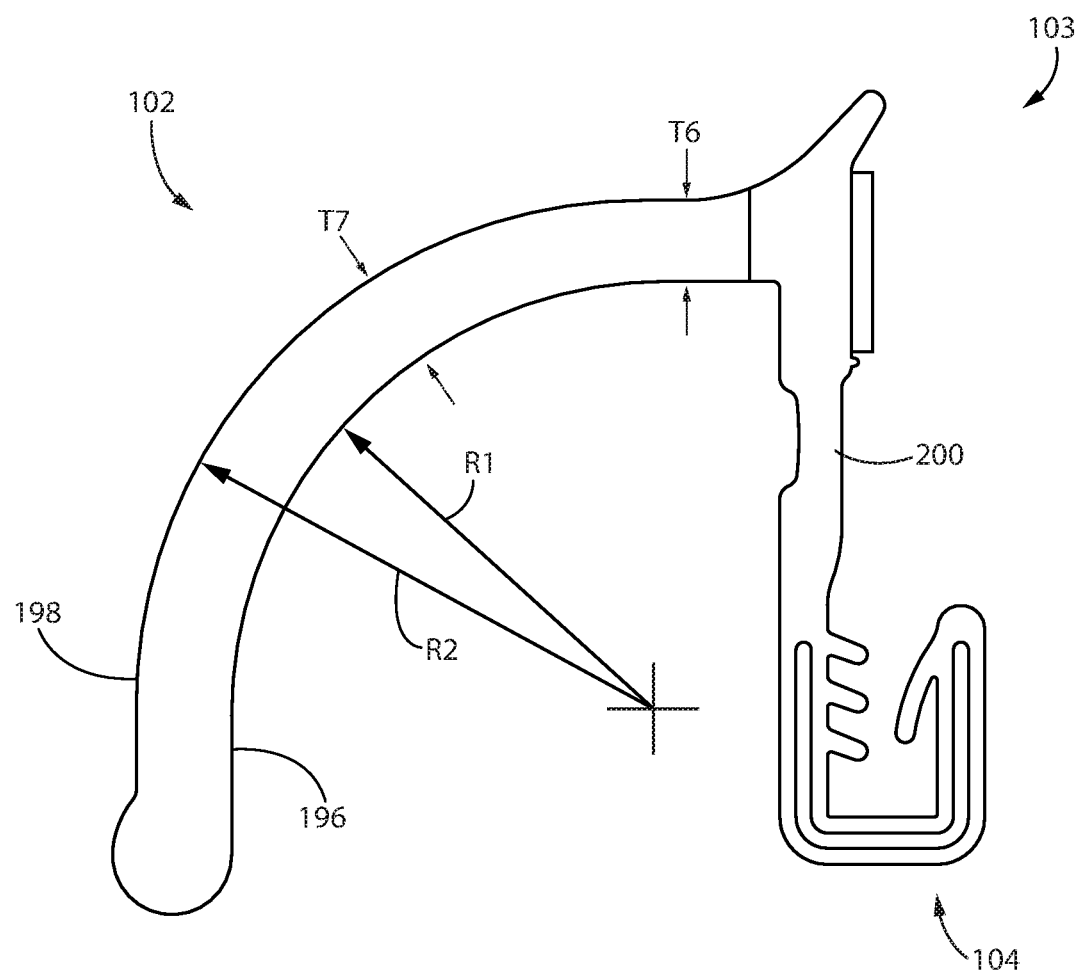
FIG. 11B shows a side view of the embodiment shown in FIG. 11A.

With reference to FIGS. 11A and 11B, in some embodiments, the inner surface 196 and the outer surface 198 of the flap 102 can be curved rather than faceted. Thus, the inner surface 196 can have a radius of curvature R1 of approximately 0.9 inch to approximately 1.0 inch. The outer surface 198 can have a radius of curvature R2 of approximately 1.0 inch to approximately 1.25 inch.

When the fender flare 100 is bent to fit onto a fender, tension is created on the outer surface 198 at the proximal end of the flap 102, and compression is created at the inner surface 196 of the flap 102 at the proximal end of the flap 102, where it intersects with the support system 103. Therefore, another technique for reducing or eliminating the buckling or puckering effect on the flap 102 is to reduce the thickness of the flap 102 at the proximal end where the flap 102 intersects with the support system 103. For example, in the faceted flaps (see, e.g. FIGS. 8A and 9A), the proximal surface 190 can have a thickness T6 of approximately 0.17 inch, while the middle surface 192 and the terminal surface 194 can have thicknesses T7, T8 of approximately 0.205 inch. In some embodiments, the thickness T6 of the proximal flap 190 can range from approximately 0.15 inch to approximately 0.20 inch. The thicknesses T7, T8 of the middle flap 192 and the terminal flap 194 can range from 0.17 inch to approximately 0.220 inch. Similarly, in embodiments in which the inner surface 196 and/or the outer surface 198 is curved (see, e.g., FIGS. 10A and 11A), the thickness T6 of the flap 102 proximal to the support system 103 can be approximately 75% to approximately 95% the thickness T7 of the flap 102 at a position more distal from the support system 103. Preferably, the thickness T6 of the flap 102 proximal to the support system 103 can be approximately 80% to approximately 90% the thickness T7 of the flap 102 at a position more distal from the support system 103. More preferably, the thickness T6 of the flap 102 proximal to the support system 103 can be approximately 83% to approximately 88% the thickness T7 of the flap 102 at a position more distal from the support system 103. The portion of the flap 102 distal to the support system 103 is the portion of the flap 102 that is further from the support system 103 relative to the proximal portion.

In use, the operator may clean the fender surface where the fastener 106 will be installed using, for example, an alcohol/water blend. The user may allow for the alcohol to flash off. The operator then can use adhesive promoter over the same area where tape will be installed, and allow appropriate time for promoter to flash off and be fully dried (time depends on how thick/wet this application is; a thin coat is recommended to minimize dry time, which is roughly 30 sec-1 min to dry). The operator positions the trim opening over the fender edge and pushes to install, and continues this process around the perimeter of the fender.

Optionally, the operator can peel a small amount of the tape liner from one side of the adhesive (approximately 6 inches or so) of the fender flare 100 and apply pressure to the fender for the adhesive to wetout. The user attaches the fender flare 100 to the fender 10 by exposing the fastener 106 (if available) on the first wall 110 or extension 182 of the support system 103, and attaching the first wall 110 of the support system 103 to the fender 10. A second wall 130 projecting from the first wall 110 can be used as a guide for proper positioning of the first wall 110. For example, the second wall 130 can project perpendicularly from the first wall 110 to function as a stop with respect to how high to position the first wall 110 along the fender 10. In some embodiments, a third wall 140 may project from the second wall 130, such that the three walls 110, 130, 140 form a U-shaped configuration or can be formed into a U-shaped configuration via a bendable second wall 130 (e.g. flexible, hinged, etc.). The first and third walls 110, 140 can be lined with fasteners 106, 176 to adhere to the fender 10 on both sides. In some embodiments, the channel 162 defined by the U-shaped configuration can be lined with protrusions 166 that can function as grips within the channel 162 without necessarily requiring the fasteners 106, 176. In some embodiments, one of the fasteners 106 can be positioned on an extension 182 of the first wall 110. As such, no other tooling is required. Holes do not have to be drilled into the fender 10 and nuts and bolts are not required. As such, the fender flare 100 of the present invention can be installed by a single person. In general, the process can take approximately 2 minutes per fender.

The fender flare 100 can be installed on fenders with radiuses of 16 inches or larger. Preferably, the fender flare 100 can be installed on fenders with radiuses of 17 inches or larger. Preferably, the trim 104 can clamp onto fenders 10 with thicknesses T1 of approximately 0.08 inch to approximately 0.157 inch; however, the trim 104 can be configured to clamp onto fenders with smaller or larger thicknesses than described.

The fender flare 100 may be manufactured on an extrusion line, using multi-extrusion techniques, such as co-extrusion or tri-extrusion. The various components, such as the flap 102 and the support system 103 may be co-extruded together. The components of the support system 103 can be co-extruded as well. Each component may be run on its own extruder so that each component can be manufactured with its own material having the desired hardness and flexibility to serve its intended function. Multi-extrusion also provides better manufacturing control. The material used for the fender flare 100 can be treated to withstand UV and weathering conditions since it is exposed to the elements. The material for the various components may be EPDM rubber. It can also be manufactured out of plastic using TPV, TPO and TPE, or any combination thereof.

In some embodiments, a tri-extrusion technique can be used to extrude the trim 104, the extension 182, and the flap 102 together. Therefore, the trim 104, the extension 182, and the flap 102 can be made of different material, hardness, or flexibility. For example, the flap 102 can have a hardness ranging from approximately 60 Shore A to approximately 95 Shore A. Preferably, the hardness of the flap 102 can range from approximately 80 Shore A to approximately 95 Shore A. More preferably, the hardness of the flap 102 ranges from approximately 85 Shore A to 90 Shore A. The extension 182 can have a hardness ranging from approximately 60 Shore A to approximately 80 Shore A. Preferably, the extension can have a hardness ranging from approximately 65 Shore A to approximately 75 Shore A. In some embodiments, the extension 182 has a hardness of approximately 70 Shore A. The trim 104 can have a hardness ranging from approximately 60 Shore A to approximately 80 Shore A. Preferably, the trim 104 can have a hardness ranging from approximately 65 Shore A to approximately 75 Shore A. In some embodiments, the trim 104 has a hardness of approximately 70 shore A. In embodiments with the seal 180 and the extension 182, the seal 180 may project from the extension 182.

The method of manufacturing the fender flare 100 of the present invention has been streamlined into a single step. In one continuous step, the fender flare 100 can be extruded from raw rubber, cured, cooled in a bath, and taped inline. As such, the fender flare 100 can be cut in straight lengths or, with the thinned segment 200, can be coiled onto plates. Thus, customers can be supplied with pre-cut lengths or bulk coils for the customers to cut to desired lengths.

The foregoing description of the preferred embodiment of the invention has been presented for the purposes of illustration and description. It is not intended to be exhaustive or to limit the invention to the precise form disclosed. Many modifications, variations, and combinations are possible in light of the above teaching. In other words, although a specific combination of features may not necessarily have been shown, such combinations have been contemplated. Therefore, it is intended that the scope of the invention not be limited by this detailed description, but by the claims and the equivalents to the claims appended hereto.

What is claimed is:

1. A fender flare, comprising:
   a. a flap; and
   b. a support system operatively connected to the flap, the support system, comprising:
      i. a first wall operatively connected to the flap, the first wall having a top end, a bottom end opposite the top end, an outboard side adjacent to the top end and the bottom end, and an inboard side opposite the outboard side and adjacent to the top end and the bottom end, wherein the flap is operatively connected the top end of the first wall, the flap projecting away from the first wall on the outboard side,
      ii. a second wall projecting perpendicularly from the bottom end of the first wall,
      iii. a third wall having a top end and a bottom end opposite the top end of the third wall, the third wall parallel to the first wall and perpendicular to the second wall, the second wall operatively connected to the third wall at the bottom end of the third wall, the first wall, second wall, and third wall each having an exterior side and an interior side opposite the exterior side, wherein the interior sides of the first wall, the second wall, and the third wall define a channel, iv. a carrier embedded in between the interior sides and exterior sides of the first wall, the second wall, and the third wall, v. a plurality of protrusions projecting from the interior sides of the first wall and the second wall into the channel, vi. a thinned segment in line with the first wall and positioned in between the first wall and the flap, vii. an adhesive positioned above the first wall, and viii. a seal projecting obliquely and above the support system.

2. A fender flare, comprising:
a) a flap; and
b) a support system operatively connected to the flap by a hinge, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall.

3. The fender flare of claim 2, wherein the trim has a U-shaped configuration defined by the first wall, the second wall, and the third wall; the first wall, second wall, and third wall ach haying an exterior side and an interior side opposite the exterior side, wherein the interior sides of the first wall, the second wall, and the third wall define a channel.

4. The fender flare of claim 2, wherein the flap is faceted, comprising a proximal facet operatively connected to the support system, a terminal facet, and a middle facet therebetween.

5. The fender flare of claim 4, wherein the terminal facet has a width that is smaller than a width of the middle facet.

6. A fender flare, comprising:
a) a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the trim has a U-shaped configuration defined by the first wall, the second wall, and the third wall; the first wall, second wall, and third wall each having an exterior side and an interior side opposite the exterior side, wherein the interior sides of the first wall, the second wall, and the third wall define a channel, wherein the support system further comprises a thinned segment along the first wall.

7. The fender flare of claim 6, wherein the support system further comprises a carrier embedded in between the interior sides and exterior sides of the first wall, the second wall, and the third wall.

8. The fender flare of claim 7, wherein the support system further comprises a plurality of protrusions projecting from the interior sides of the first wall and the third wall into the channel.

9. The fender flare of claim 8, wherein the support system further comprises an extension connecting the trim to the flap.

10. The fender flare of claim 9, further comprising an adhesive operatively connected to the extension.

11. The fender flare of claim 10, further comprising at least one buttress positioned adjacent to at least one protrusion to obstruct movement of the at least one protrusion in one direction.

12. The fender flare of claim 11, further comprising a seal positioned between the flap and the support system.

13. The fender flare of claim 12, further comprising a stabilizer operatively connecting the flap to the support system.

14. A fender flare, comprising:
a) a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the trim has a U-shaped configuration defined by the first wall, the second wall, and the third wall; the first wall, second wall, and third wall each having an exterior side and an interior side opposite the exterior side, wherein the interior sides of the first wall, the second wall, and the third wall define a channel, wherein the support system further comprises a carrier embedded in between the interior sides and exterior sides of the first wall, the second wall, and the third wall.

15. A fender flare, comprising:
a) a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the trim has a U-shaped configuration defined by the first wall, the second wall, and the third wall; the first wall, second wall, and third wall each having an exterior side and an interior side opposite the exterior side, wherein the interior sides of the first wall, the second wall, and the third wall define a channel, wherein the support system further comprises a protrusion projecting into the channel.

16. The fender flare of claim 15, further comprising a buttress positioned adjacent to the protrusion to obstruct movement of the protrusion in one direction.

17. The fender flare of claim 16, further comprising an adhesive operatively connected to the first wall.

18. A fender flare, comprising:
a) a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the trim has a U-shaped configuration defined by the first wall, the second wall, and the third wall; the first wall, second wall, and third wall each having an exterior side and an interior side opposite the exterior side, wherein the interior sides of the first wall, the second wall, and the third wall define a channel, further comprising a stabilizer operatively connecting the flap to the support system.

19. A fender flare, comprising:
a) a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the second wall is a hinge to move the trim between a planar configuration in which the first wall and the second wall are co-planar and a U-shape configuration that defines a channel.

20. A fender flare, comprising:
a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the second wall is a hinge to configure the trim into a U-shape configuration that defines a channel, and further comprising a first adhesive operatively connected to the first wall; and a second adhesive operatively connected to the third wall.

21. A fender flare, comprising:
a) a flap; and
b) a support system operatively connected to the flap, the support system comprising a. trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the flap is faceted, comprising a proximal facet operatively connected to the support system, a terminal facet, and a middle facet therebetween, wherein the flap comprises an outer surface and an inner surface, and wherein the outer surface is faceted, and wherein the inner surface is curved.

22. A fender flare, comprising:
a) a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the flap comprises an outer surface and an inner surface, and wherein the outer surface of the flap has a radius of curvature of approximately 1.0 inch to approximately 1.25 inch, and the inner surface has a radius of curvature of approximately 0.9 inch to approximately 1.0 inch.

23. A fender flare, comprising:
a) a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein a thickness of a first portion of the flap at an end proximal to the support system is less than a thickness of a second portion of the flap distal from the support system.

24. A fender flare, comprising:
a) a flap; and
b) a support system operatively connected to the flap, the support system comprising a trim defined by a first wall having a first end and a second end opposite the first end, a second wall operatively connected to the second end of the first wall, and a third wall having a first end and a second end opposite the first end of the third wall, the second wall operatively connected to the third wall at the second end of the third wall, wherein the first wall tapers into a lead-in into a channel defined by the trim, wherein the first wall tapers into the lead-in.

* * * * *